United States Patent
Chen

(10) Patent No.: US 8,130,818 B2
(45) Date of Patent: Mar. 6, 2012

(54) MAXIMIZING POWER AND SPECTRAL EFFICIENCIES FOR LAYERED AND CONVENTIONAL MODULATIONS

(75) Inventor: Ernest C. Chen, San Pedro, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

(21) Appl. No.: 12/973,710

(22) Filed: Dec. 20, 2010

(65) Prior Publication Data

US 2011/0154412 A1     Jun. 23, 2011

Related U.S. Application Data

(63) Continuation of application No. 12/207,462, filed on Sep. 9, 2008, now Pat. No. 7,920,643, which is a continuation of application No. 10/532,619, filed as application No. PCT/US03/32800 on Oct. 16, 2003, now Pat. No. 7,471,735, said application No. 10/532,619 is a continuation-in-part of application No. 09/844,401, filed on Apr. 27, 2001, now Pat. No. 7,209,524.

(60) Provisional application No. 60/421,288, filed on Oct. 25, 2002.

(51) Int. Cl.
    *H04B 1/38*      (2006.01)
(52) U.S. Cl. .................... 375/219; 375/324; 375/295
(58) Field of Classification Search .............. 375/219, 375/295, 324, 316, 279, 281, 329
See application file for complete search history.

(56) References Cited

U.S. PATENT DOCUMENTS

| | | | |
|---|---|---|---|
| 4,864,640 A | 9/1989 | Roza | |
| 5,127,051 A | 6/1992 | Chan et al. | |
| 5,467,197 A * | 11/1995 | Hoff | 386/299 |
| 5,625,640 A * | 4/1997 | Palmer et al. | 375/132 |
| 5,649,291 A | 7/1997 | Tayloe | |
| 5,796,786 A | 8/1998 | Lee | |
| 5,995,495 A | 11/1999 | Sampson | |
| 6,047,162 A | 4/2000 | Lazaris-Brunner et al. | |
| 6,075,781 A | 6/2000 | Ohlson et al. | |
| 6,266,534 B1 * | 7/2001 | Raith et al. | 455/456.3 |
| 6,574,794 B1 | 6/2003 | Sarraf | |
| 6,671,338 B1 | 12/2003 | Gamal et al. | |
| 6,788,917 B1 | 9/2004 | Refai et al. | |
| 7,616,706 B2 | 11/2009 | Koslov | |
| 2002/0051581 A1 | 5/2002 | Takeuchi et al. | |

OTHER PUBLICATIONS

Non-final Office action dated Aug. 30, 2011 in U.S. Appl. No. 12/404,253, filed Mar. 13, 2009 by Ernest C. Chen et al.

(Continued)

*Primary Examiner* — Emmanuel Bayard

(57) ABSTRACT

Methods and apparatuses for maximizing power and spectral efficiencies in a wireless communication system are disclosed. The invention is particularly useful for layered modulation applications because power levels for such applications are relatively high. A layered modulation signal comprises an upper and a lower layer signal that interfere with each other within the same frequency band such that the upper layer signal can be demodulated directly from the layered modulation signal, and the lower layer signal can be demodulated after subtracting the first layer signal from the layered modulation signal. The invention applies one or more of the following four signal schemes in a communication signal including varying the symbol rate (rather than the code rate), reducing or eliminating the guard band, reducing excess signal bandwidth and employing layered modulation within the guard band of the legacy signal.

16 Claims, 35 Drawing Sheets

OTHER PUBLICATIONS

Canadian Office action dated Jan. 19, 2011 in Canadian Patent Application No. 2491259 filed Jul. 3, 2003 by Ernest C. Chen et al.
Final Rejection dated Sep. 26, 2011 in U.S. Appl. No. 12/190,526, filed Aug. 12, 2008 by Paul R. Anderson.
Non-final Office action dated Jun. 10, 2011 in U.S. Appl. No. 12/259,744, filed Oct. 28, 2008 by Ernest C. Chen.
Non-final Office action dated Jun. 10, 2011 in U.S. Appl. No. 12/190,526, filed Aug. 12, 2008 by Paul R. Anderson et al.

* cited by examiner

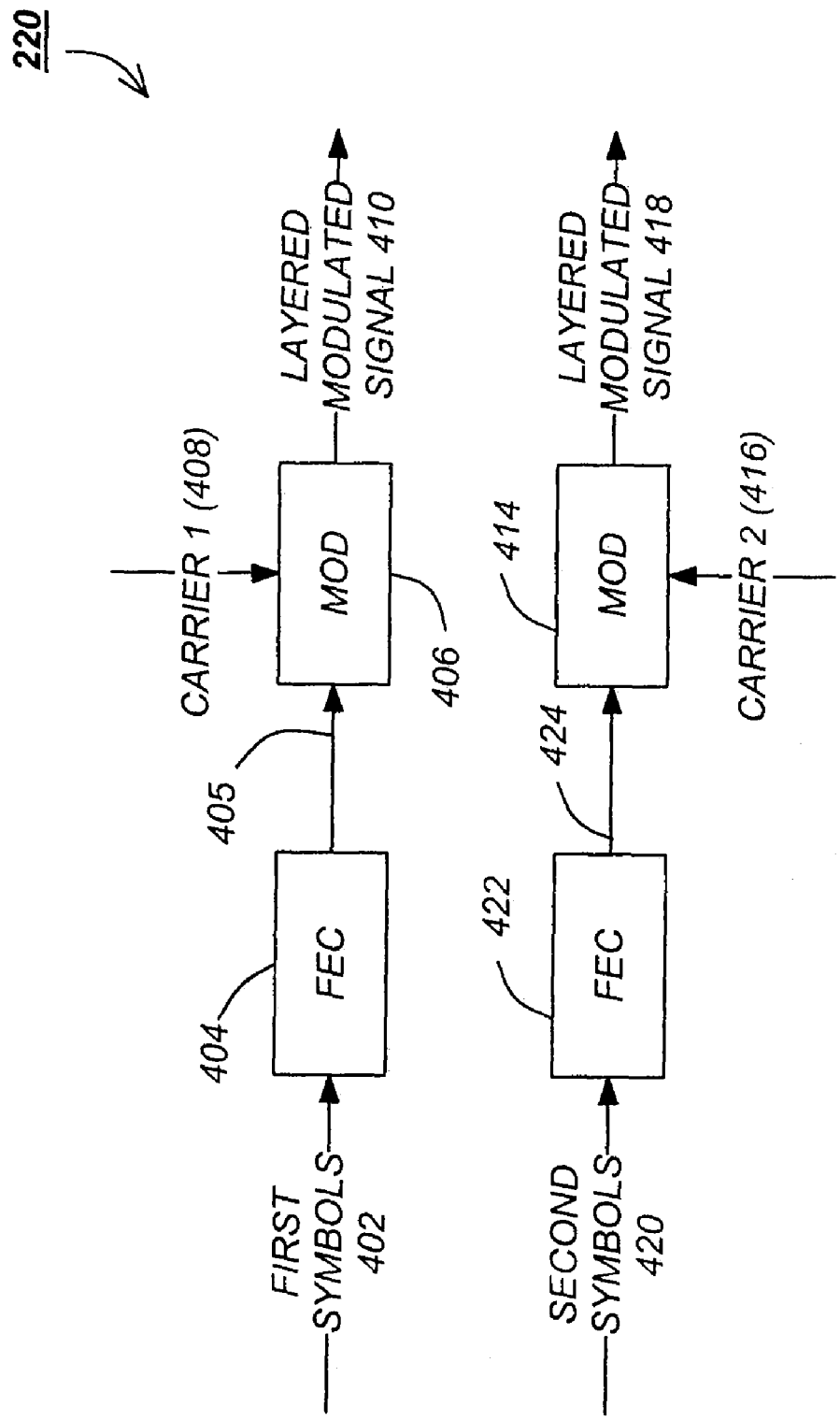

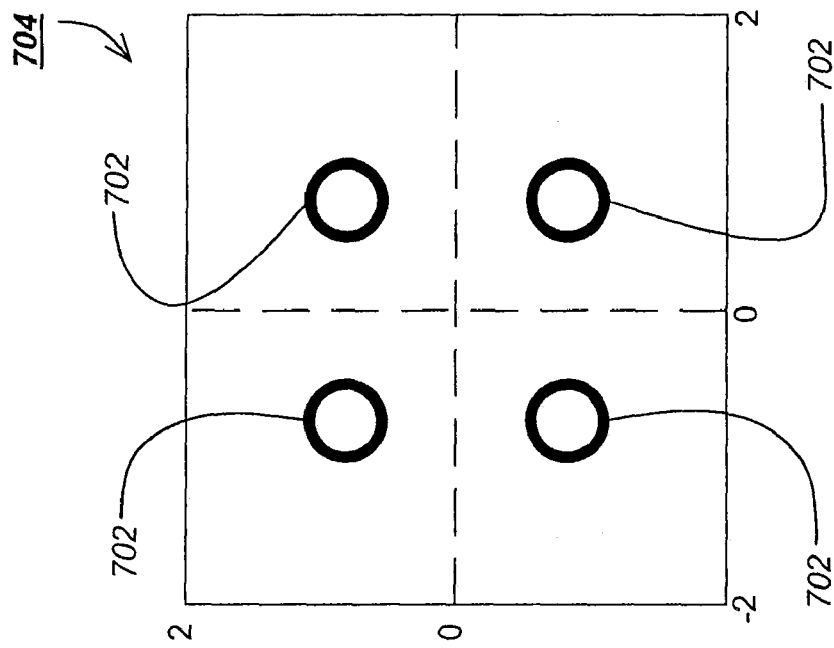
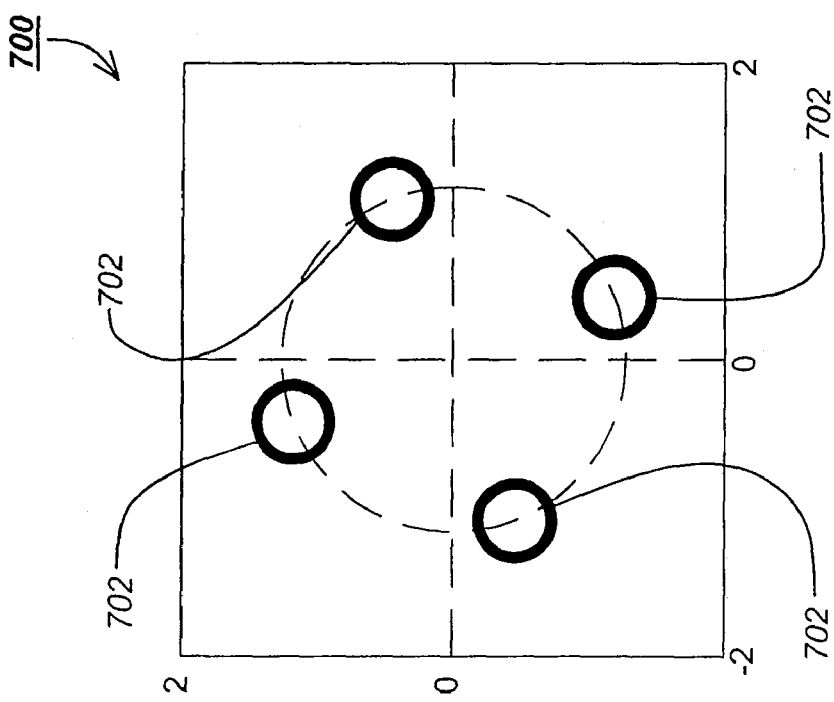

MAXIMIZING POWER AND SPECTRAL EFFICIENCIES FOR LAYERED AND CONVENTIONAL MODULATIONS

CROSS-REFERENCE TO RELATED APPLICATIONS

This application is a continuation of U.S. patent application Ser. No. 12/207,462, filed Sep. 9, 2008, which is a continuation of U.S. patent application Ser. No. 10/532,619, filed Apr. 25, 2005, now issued Dec. 30, 2008, as U.S. Pat. No. 7,471,735, by Ernest C. Chen, entitled "MAXIMIZING POWER AND SPECTRAL EFFICIENCIES FOR LAYERED AND CONVENTIONAL MODULATIONS," which application is a National Stage application of and claims the benefit under 35 U.S.C. §365 to PCT application US03/32800, filed Oct. 16, 2003, by Ernest C. Chen, entitled "MAXIMIZING POWER AND SPECTRAL EFFICIENCIES FOR LAYERED AND CONVENTIONAL MODULATIONS," which claims the benefit under 35 U.S.C. §119(e) of U.S. Provisional Application Ser. No. 60/421,288, filed Oct. 25, 2002, by Ernest C. Chen, entitled "MAXIMIZING POWER AND SPECTRAL EFFICIENCIES FOR LAYERED AND CONVENTIONAL MODULATIONS," which applications are hereby incorporated by reference herein. U.S. patent application Ser. No. 10/532,619 is also a continuation-in-part application of U.S. application Ser. No. 09/844,401, filed Apr. 27, 2001, by Ernest C. Chen, entitled "LAYERED MODULATION FOR DIGITAL SIGNALS," now issued as U.S. Pat. No. 7,209,524, which is incorporated by reference herein.

BACKGROUND OF THE INVENTION

1. Field of the Invention

The present invention relates to systems and methods for power and spectral efficient transmission of signals, particularly signals using layered modulations.

2. Description of the Related Art

Digital signal communication systems have been used in various fields, including digital TV signal transmission, either terrestrial or satellite. As the various digital signal communication systems and services evolve, there is a burgeoning demand for increased data throughput and added services. However, it is more difficult to implement either improvement in old systems and new services when it is necessary to replace existing legacy hardware, such as transmitters and receivers. New systems and services are advantaged when they can utilize existing legacy hardware. In the realm of wireless communications, this principle is further highlighted by the limited availability of electromagnetic spectrum. Thus, it is not possible (or at least not practical) to merely transmit enhanced or additional data at a new frequency.

The conventional method of increasing spectral capacity is to move to a higher-order modulation, such as from quadrature phase shift keying (QPSK) to eight phase shift keying (8PSK) or sixteen quadrature amplitude modulation (16QAM). Unfortunately, QPSK receivers cannot demodulate conventional 8PSK or 16QAM signals. As a result, legacy customers with QPSK receivers must upgrade their receivers in order to continue to receive any signals transmitted with an 8PSK or 16QAM modulation.

It is advantageous for systems and methods of transmitting signals to accommodate enhanced and increased data throughput without requiring additional frequency. In addition, it is advantageous for enhanced and increased throughput signals for new receivers to be backwards compatible with legacy receivers. There is further an advantage for systems and methods which allow transmission signals to be upgraded from a source separate from the legacy transmitter.

It has been proposed that a layered modulation signal, transmitting non-coherently both upper and lower layer signals, can be employed to meet these needs. See Utility application Ser. No. 09/844,401. Such layered modulation systems allow higher information throughput with backwards compatibility. However, even when backward compatibility is not required (such as with an entirely new system), layered modulation can still be advantageous because it requires a traveling wave tube amplifier (TWTA) peak power significantly lower than that for a conventional 8PSK or 16QAM modulation format for a given throughput.

In the case of layered modulation systems designed to be backwards compatible with legacy receivers and signals, such as existing satellite television receivers for systems such as DIRECTV, the power requirements to produce additional layered signals are excessive. Some systems and methods have been recently proposed to facilitate layered modulation signals. However, none of these systems propose systems or methods that address the high power requirements of implementing backwards compatible layered modulation signals, particularly with respect to satellite television applications.

Accordingly, there is a need for systems and methods that mitigate the high power requirements of implementing backwards compatible layered modulation signals, particularly with respect to satellite television applications. The present invention meets these and other needs as described hereafter.

SUMMARY OF THE INVENTION

In the present invention four signal schemes are disclosed which greatly alleviate the power requirements for layered modulation and provide for an increase in system information throughput, particularly in backwards compatible layered modulation satellite television applications. In a first signal scheme, the symbol rate (rather than code rate) is varied. In a second signal scheme, the guard band is reduced or eliminated. In a third signal scheme, the signal excess bandwidth ratio is reduced. Finally, in a fourth signal scheme, layered modulation is applied in the guard band. These distinct signal schemes can be used alone or in combination to improve the signal efficiency of in a satellite television system thereby enabling a layered modulation transmission at conventional power levels.

In a typical method embodiment of the invention an upper layer signal with a first excess bandwidth ratio is amplified to a first power level within a frequency band. Next a lower layer signal with a second excess bandwidth ratio is amplified to a second power level within the frequency band, the second power level being exceeded by the first power level. Finally, a layered modulation signal is transmitted for at least one receiver including the upper layer signal and the lower layer signal. The layered modulation signal comprises both the upper layer signal and the lower layer signal interfering with each other within the frequency band such that the upper layer signal can be demodulated directly from the layered modulation signal and the lower layer signal can be demodulated after subtracting the upper layer signal from the layered modulation signal. Importantly, no guard band is used within the frequency band.

In further embodiments of the invention the lower layer signal can include a lower layer code rate that is less than the upper layer code rate. In other further embodiments the excess bandwidth ratios of the upper and lower layer signals do not exceed 0.2. Typically, the upper layer signal comprises a legacy signal in a satellite television system which has a reduced excess bandwidth ratio over the original legacy signal.

In one exemplary embodiment the frequency band can include a third signal having a third excess bandwidth ratio and occupying a majority of the frequency band. In this case, the third signal can be the legacy signal of a satellite television system. In one example, the upper and lower layer signals do not interfere with the third signal. In another case, the lower layer signal can interfere with the third signal as well as the upper layer signal. In a further example, the bandwidth ratios of the upper and lower layer signal do not exceed 0.1 and the excess bandwidth ratio of the third signal does not exceed 0.2.

A typical system for transmitting the described layered signal includes a first amplifier amplifying the upper layer signal and a second amplifier amplifying the lower layer signal. At least one antenna transmits the layered modulation signal comprising the upper and lower layer signals. The upper layer signal can be a legacy signal in a satellite television system. The first amplifier and the second amplifier can operate in a common satellite or in different satellites. Similarly, the upper and lower layer signals can be transmitted from a common antenna or different antennas.

A third amplifier can be added to amplify a third signal having a third excess bandwidth ratio and occupying a majority of the frequency band. In this case, at least two of the three amplifiers can operate in a common satellite. Also, two of the three signals of the layered modulation signal can be transmitted from a common antenna.

In one exemplary implementation, a three-phased throughput upgrade plan can be applied to an existing satellite television system incorporating the above signal schemes. The upgrade provides an information throughput increases from approximately 50% to approximately 164% relative to legacy systems, while maintaining receiver/decoder backward compatibility. The required TWTA power levels associated with the phases are also progressive, from the current power level of approximately 240 Watts to approximately 850 Watts. Thus, the same availability as that of an existing satellite television system such as the DIRECTV continental U.S. (CONUS) service can be attained.

BRIEF DESCRIPTION OF THE DRAWINGS

Referring now to the drawings in which like reference numbers represent corresponding parts throughout:

FIG. 4 is a block diagram showing one embodiment of the modulator for the uplink signal;

FIGS. 7A-7C are diagrams illustrating a signal constellation of a second transmission layer over the first transmission layer after first layer demodulation;

DETAILED DESCRIPTION OF THE PREFERRED EMBODIMENT

Figure 1:
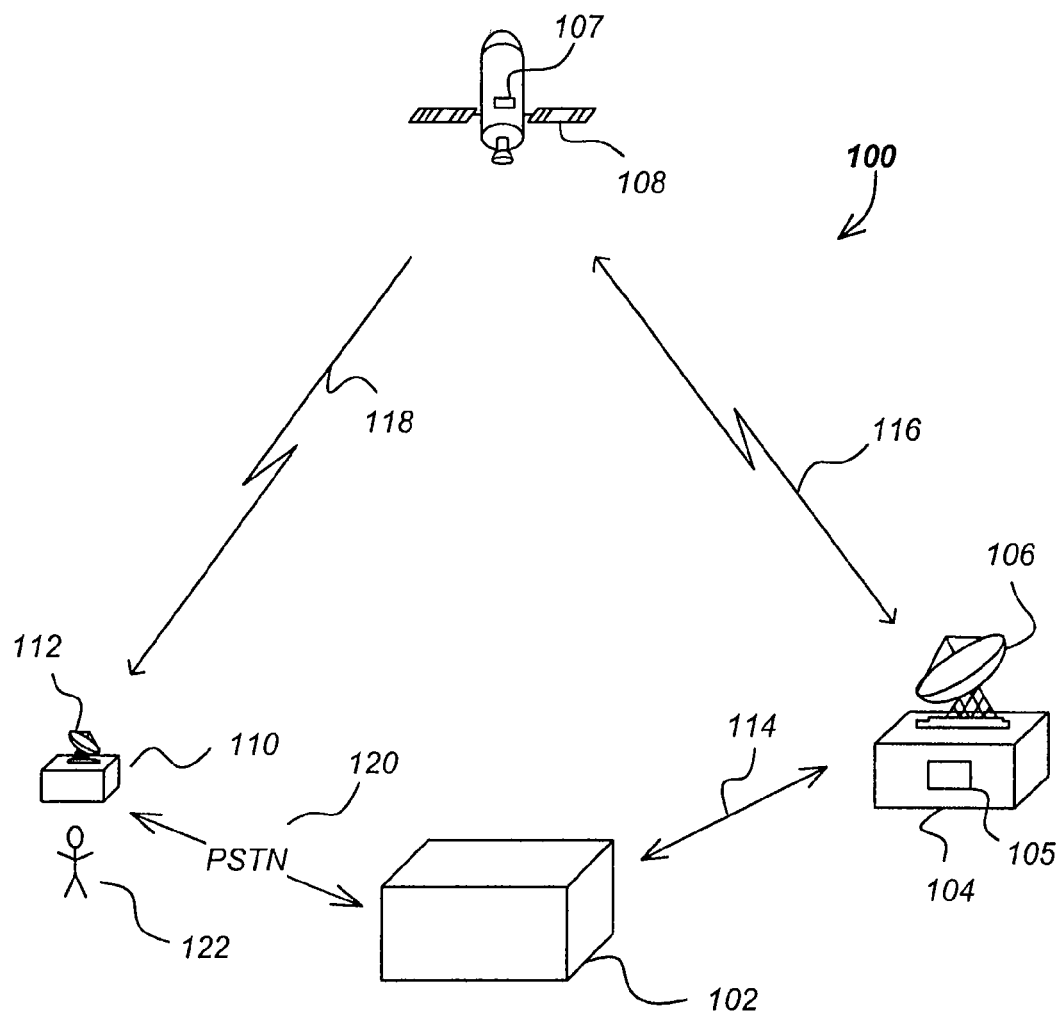
FIG. 1 is a diagram illustrating an overview of a single satellite video distribution system.

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

1. Overview

As described in more detail hereafter, layered modulation (LM) reconstructs the upper layer signal and removes it from the received signal to leave a lower-layer signal. Lower layer signal demodulation performance requires good signal cancellation, which in turn requires the reconstructed signal to include accurate amplitude and phase effects from signal propagation path, filter and low noise block (LNB). Values of these parameters change from receiver to receiver and therefore must be estimated at each receiver.

One difficulty with the implementation of the layered modulation techniques, such as disclosed in Utility application Ser. No. 09/844,401, filed Apr. 27, 2001, by Ernest C. Chen, entitled "LAYERED MODULATION FOR DIGITAL SIGNALS," is that the upper layer signal requires excessive satellite TWTA power beyond the current levels for a typical continental United States (CONUS) coverage. The present invention reduces the required powers to levels to current conventional TWTA power limits. Therefore, there is no need to wait for TWTA power technology to further develop before layered modulation can be implemented. In addition, the disclosed signal schemes further increase the information throughput with layered modulation since the entire bandwidth is used more efficiently.

The layered modulation technique as previously disclosed in Utility application Ser. No. 09/844,401 established that the upper layer signal must carry a power substantially higher than that of the lower layer signal in order for the technique to operate. Typically, such backwards-compatible (BWC) applications need more power than non-BWC applications for the upper layer signal. Exemplary deployment scenarios require power levels of upper layer signal significantly beyond satellite TWTA power technology for BWC applications.

As an example, the DIRECTV and GALAXY LATIN AMERICA systems combined have more than 10 million subscribers receiving QPSK signals from satellites. The conventional method of increasing information throughput over existing transponders would directly switching to a higher order modulation scheme such as 8PSK or 16 QAM. Unfortunately, this approach would require a changeover of all IRDs in the field to be able to receive the new signal. In contrast, deployment with the techniques of this invention (and Utility application Ser. No. 09/844,401), in the context of layered modulation, would allow existing IRDs to continue receiving the legacy signal without modification. New and/or upgraded subscribers would employ a new IRD to receive the new signal in addition to the legacy signal, both of which share the bandwidth. The potential savings of this transition is hundreds of million dollars, representing the costs of mandatory replacement of all existing IRDs. In addition, a changeover of all IRDs over a short time period, as required by the conventional approach, would be logistically infeasible.

In addition, the layered modulation technique can be used in communication systems outside of satellite television systems such as DIRECTV. For example, the very small aperture terminal (VSAT) throughput for new customers could be increased in a BWC mode without interrupting the service to the tens of thousands of existing customers. Another example would be throughput increases for two-way voice and data communications systems using geosynchronous and low Earth orbit (LEO) satellites. Still other possibilities include BWC and non-BWC applications of digital terrestrial broadcasting, digital cable, and cable modem services.

In situations where BWC is not required, layered modulation can also be used to provide higher throughputs than conventional waveforms using the same power levels. Using QPSK and/or 8PSK for modulation layers for a new-service system, there will be no need for highly linear transponder TWTAs and/or special methods to adequately compensate for TWTA nonlinearity. Layered modulation can therefore achieve the high spectral efficiency of the 16 QAM modulation with its two-layered QPSK modulation.

Various embodiments of this invention which effectively reduce power requirements for layered modulation make the layered modulation technique even more attractive in terms of power and bandwidth efficiency in many applications. In the sections hereafter, an exemplary satellite video distribution system and associate hardware implementing layered modulation are described. The system and hardware can employ the power and spectral efficient signal schemes of the present invention.

2. Video Distribution System

FIG. 1 is a diagram illustrating an overview of a single satellite video distribution system 100. The video distribution system 100 is comprised of a control center 102 in communication with an uplink center 104 via a ground or other link 114 and with a subscriber receiver station 110 via a public switched telephone network (PSTN) or other link 120. The control center 102 provides program material (e.g. video programs, audio programs and data) to the uplink center 104 and coordinates with the subscriber receiver stations 110 to offer, for example, pay-per-view (PPV) program services, including billing and associated decryption of video programs.

The uplink center 104 receives program material and program control information from the control center 102, and using an uplink antenna 106 and transmitter 105, transmits the program material and program control information to the satellite 108 via uplink signal 116. The satellite receives and processes this information, and transmits the video programs and control information to the subscriber receiver station 110 via downlink signal 118 using transmitter 107. The subscriber receiving station 110 receives this information using the outdoor unit (ODU) 112, which includes a subscriber antenna and a low noise block converter (LNB).

In one embodiment, the subscriber receiving station antenna is an 18-inch slightly oval-shaped Ku-band antenna. The slight oval shape is due to the 22.5 degree offset feed of the LNB (low noise block converter) which is used to receive signals reflected from the subscriber antenna. The offset feed positions the LNB out of the way so it does not block any surface area of the antenna minimizing attenuation of the incoming microwave signal.

The video distribution system 100 can comprise a plurality of satellites 108 in order to provide wider terrestrial coverage, to provide additional channels, or to provide additional bandwidth per channel. In one embodiment of the invention, each satellite is comprised of 16 transponders to receive and transmit program material and other control data from the uplink center 104 and provide it to the subscriber receiving stations 110. Using data compression and multiplexing techniques the channel capabilities, two satellites 108 working together can receive and broadcast over 150 conventional (non-HDTV) audio and video channels via 32 transponders.

While the invention disclosed herein will be described with reference to a satellite-based video distribution system 100, the present invention may also be practiced with terrestrial-based transmission of program information, whether by broadcasting means, cable, or other means. Further, the different functions collectively allocated among the control center 102 and the uplink center 104 as described above can be reallocated as desired without departing from the intended scope of the present invention.

Although the foregoing has been described with respect to an embodiment in which the program material delivered to the subscriber 122 is video (and audio) program material such as a movie, the foregoing method can be used to deliver program material comprised of purely audio information or other data as well.

2.1 Uplink Configuration

Figure 2:
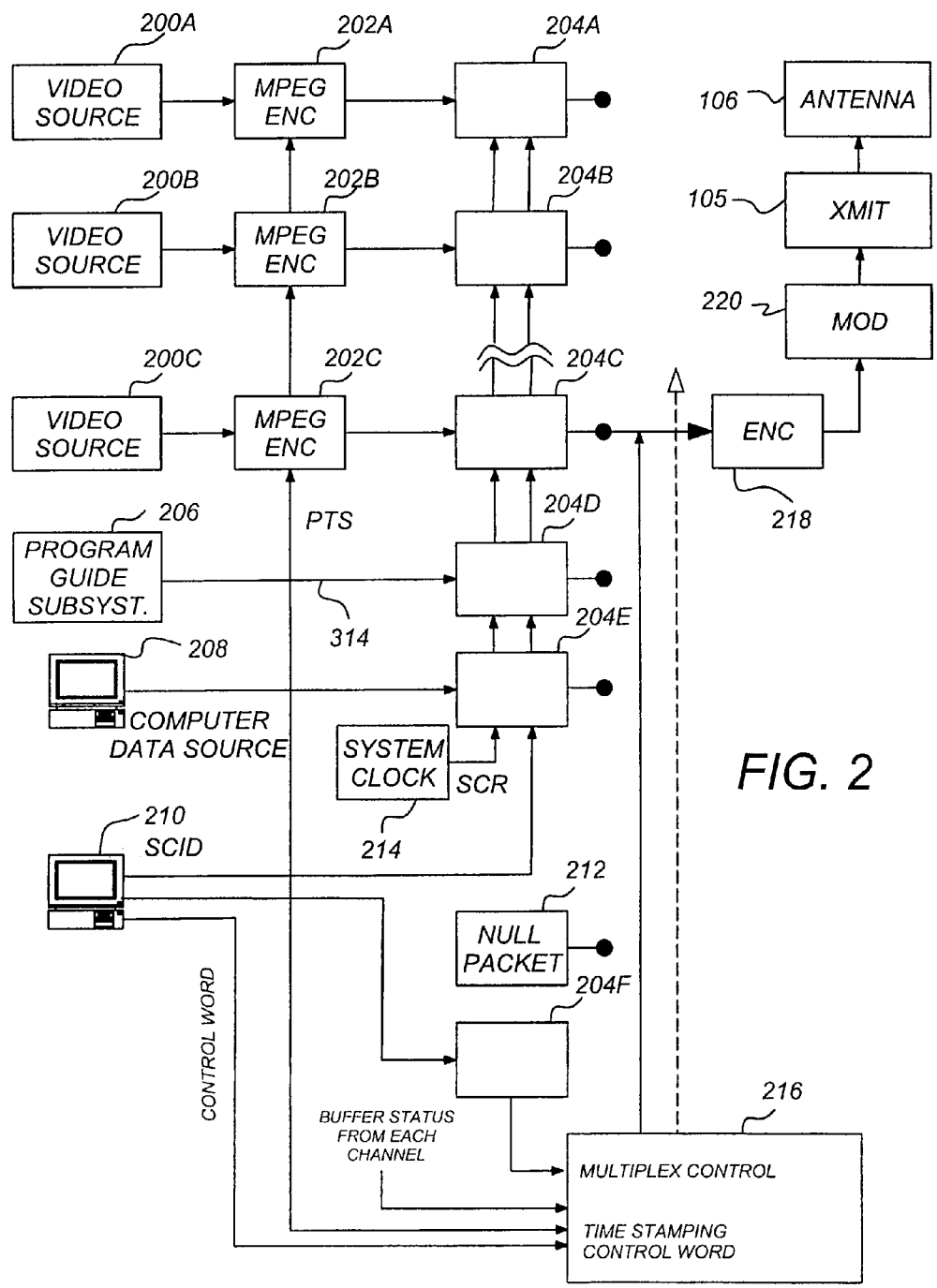
FIG. 2 is a block diagram showing a typical uplink configuration for a single satellite transponder.

FIG. 2 is a block diagram showing a typical uplink configuration for a single satellite 108 transponder, showing how video program material is uplinked to the satellite 108 by the control center 102 and the uplink center 104. FIG. 2 shows three video channels (which may be augmented respectively with one or more audio channels for high fidelity music, soundtrack information, or a secondary audio program for transmitting foreign languages), a data channel from a program guide subsystem 206 and computer data information from a computer data source 208.

Typical video channels are provided by a program source 200A-200C of video material (collectively referred to hereinafter as program source(s) 200). The data from each program source 200 is provided to an encoder 202A-202C (collectively referred to hereinafter as encoder(s) 202). Each of the encoders accepts a program time stamp (PTS) from the controller 216. The PTS is a wrap-around binary time stamp that is used to assure that the video information is properly synchronized with the audio information after encoding and decoding. A PTS time stamp is sent with each I-frame of the MPEG encoded data.

In one embodiment of the present invention, each encoder 202 is a second generation Motion Picture Experts Group (MPEG-2) encoder, but other decoders implementing other coding techniques can be used as well. The data channel can be subjected to a similar compression scheme by an encoder (not shown), but such compression is usually either unnecessary, or performed by computer programs in the computer data source (for example, photographic data is typically compressed into *.TIF files or *.JPG files before transmission). After encoding by the encoders 202, the signals are converted into data packets by a packetizer 204A-204F (collectively referred to hereinafter as packetizer(s) 204) associated with each program source 200.

The output data packets are assembled using a reference from the system clock 214 (SCR), and from the conditional access manager 210, which provides the service channel identifier (SCID) to the packetizers 204 for use in generating the data packets. These data packets are then multiplexed into serial data and transmitted.

2.2 Broadcast Data Stream Format and Protocol

Figure 3A:
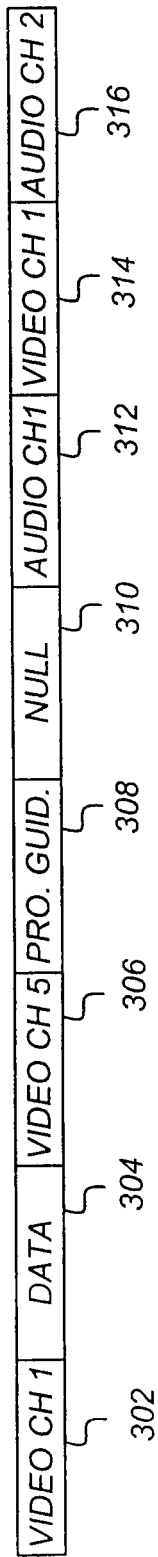
FIG. 3A is a diagram of a representative data stream.

FIG. 3A is a diagram of a representative data stream. The first packet 302 is comprised of information from video channel 1 (data coming from, for example, the first video program source 200A). The next packet 304 is comprised of computer data information that was obtained, for example from the computer data source 208. The next packet 306 is comprised of information from video channel 5 (from one of the video program sources 200). The next packet 308 is comprised of program guide information such as the information provided by the program guide subsystem 206. As shown in FIG. 3A, null packets 310 created by the null packet module 212 may be inserted into the data stream as desired followed by further data packets 312, 314, 316 from the program sources 200.

Referring back to FIG. 2, the data stream therefore is comprised of a series of packets (302-316) from any one of the data sources (e.g. program sources 200, program guide subsystem 206, computer data source 208) in an order determined by the controller 216. The data stream is encrypted by the encryption module 218, modulated by the modulator 220 (typically using a QPSK modulation scheme), and provided to the transmitter 105, which broadcasts the modulated data stream on a frequency bandwidth to the satellite via the antenna 106. The receiver 500 at the receiver station 110 receives these signals, and using the SCID, reassembles the packets to regenerate the program material for each of the channels.

Figure 3B:
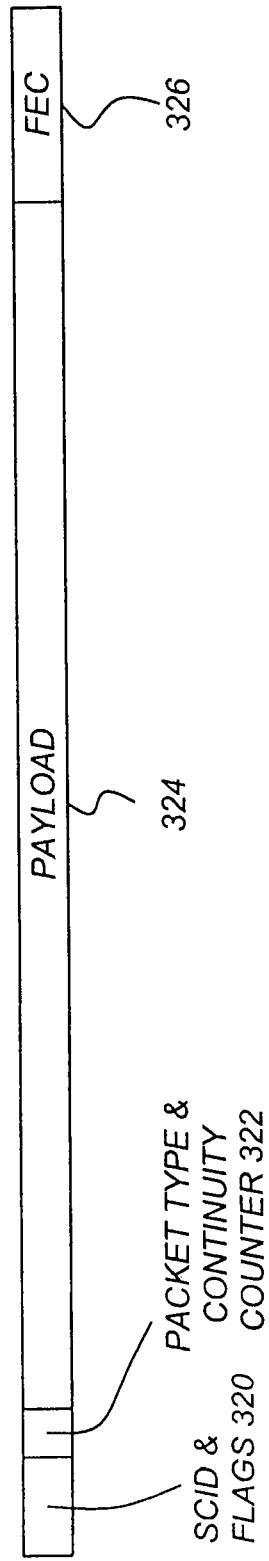
FIG. 3B is a diagram of a representative data packet.

FIG. 3B is a diagram of a data packet. Each data packet (e.g. 302-316) is 147 bytes long, and is comprised of a number of packet segments. The first packet segment 320 is comprised of two bytes of information containing the SCID and flags. The SCID is a unique 12-bit number that uniquely identifies the data packet's data channel. The flags include 4 bits that are used to control other features. The second packet segment 322 is made up of a 4-bit packet type indicator and a 4-bit continuity counter. The packet type generally identifies the packet as one of the four data types (video, audio, data, or null). When combined with the SCID, the packet type determines how the data packet will be used. The continuity counter increments once for each packet type and SCID. The next packet segment 324 is comprised of 127 bytes of payload data, which in the cases of packets 302 or 306 is a portion of the video program provided by the video program source 200. The final packet segment 326 is data required to perform forward error correction.

FIG. 4 is a block diagram showing one embodiment of the modulator 220. The modulator 220 optionally is comprised of a forward error correction (FEC) encoder 404 which accepts the first signal symbols 402 and adds redundant information that are used to reduce transmission errors. The coded symbols 405 are modulated by modulator 406 according to a first carrier 408 to produce an upper layer modulated signal 410. Second symbols 420 are likewise provided to an optional second FEC encoder 422 to produce coded second symbols 424. The coded second symbols 424 are provided to a second modulator 414, which modulates the coded second signals 424 according to a second carrier 416 to produce a lower layer modulated signal 418. The upper layer modulated signal 410 and the lower layer modulated signal 418 are therefore uncorrelated. Thus, the upper layer signal 410 and the lower layer signal 418 can be transmitted to separate transponders on one or more satellites 108 via separate uplink signals 116. Thus, the lower layer signal 418 can be implemented from a separate satellite 108 that receives a separate uplink signal 116. However, in the downlink signal 118 the upper layer signal 410, must be a sufficiently greater amplitude signal than the lower layer signal 418, to maintain the signal constellations shown in FIG. 6 and FIG. 7.

It should be noted that it may be more efficient to retrofit an existing system by using a transponder on a separate satellite 108 to transmit the lower layer downlink signal over the existing legacy downlink signal rather than replacing the legacy satellite with one that will transmit both downlink signal layers. Emphasis can be given to accommodating the downlink legacy signal in implementing a layered downlink broadcast.

2.3 Integrated Receiver/Decoder

Figure 5:
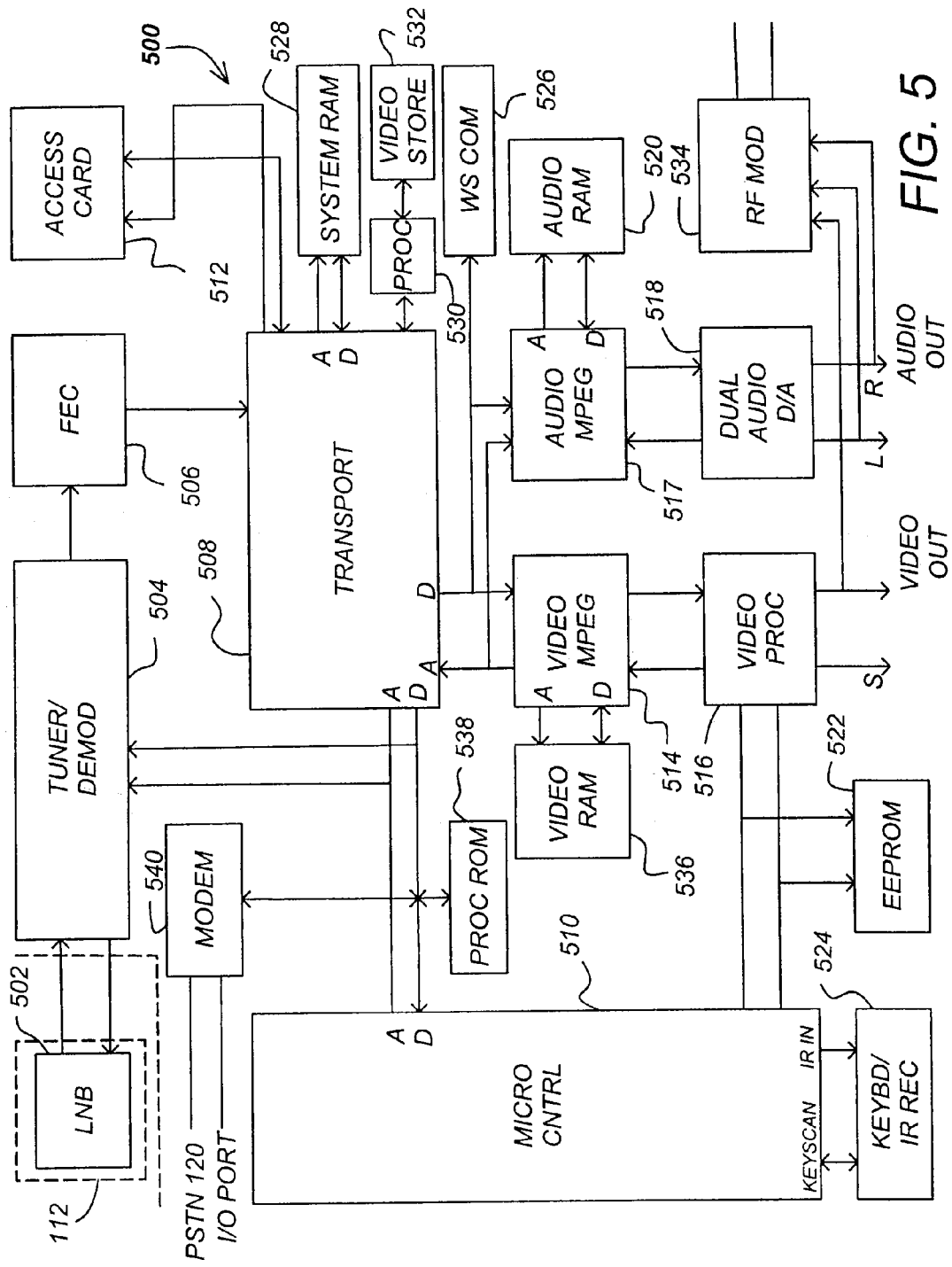
FIG. 5 is a block diagram of an integrated receiver/decoder (IRD)

FIG. 5 is a block diagram of an integrated receiver/decoder (IRD) 500 (also hereinafter alternatively referred to as receiver 500). The receiver 500 is comprised of a tuner/demodulator 504 communicatively coupled to an ODU 112 having one or more low noise blocks (LNBs) 502. The LNB 502 converts the 12.2- to 12.7 GHz downlink 118 signal from the satellites 108 to, e.g., a 950-1450 MHz signal required by the IRD's 500 tuner/demodulator 504. Typically, the LNB 502 may provide either a dual or a single output. The single-output LNB 502 has only one RF connector, while the dual output LNB 502 has two RF output connectors and can be used to feed a second tuner 504, a second receiver 500, or some other form of distribution system.

The tuner/demodulator 504 isolates a single, digitally modulated 24 MHz transponder signal, and converts the modulated data to a digital data stream. The digital data stream is then supplied to a forward error correction (FEC) decoder 506. This allows the IRD 500 to reassemble the data transmitted by the uplink center 104 (which applied the forward error correction to the desired signal before transmission to the subscriber receiving station 110) verifying that the correct data signal was received, and correcting errors, if any. The error-corrected data may be fed from the FEC decoder module 506 to the transport module 508 via an 8-bit parallel interface.

The transport module 508 performs many of the data processing functions performed by the IRD 500. The transport module 508 processes data received from the FEC decoder module 506 and provides the processed data to the video MPEG decoder 514 and the audio MPEG decoder 517. As needed the transport module employs system RAM 528 to process the data. In one embodiment of the present invention, the transport module 508, video MPEG decoder 514 and audio MPEG decoder 517 are all implemented on integrated circuits. This design promotes both space and power efficiency, and increases the security of the functions performed within the transport module 508. The transport module 508 also provides a passage for communications between the microcontroller 510 and the video and audio MPEG decoders 514, 517. As set forth more fully hereinafter, the transport module also works with the conditional access module (CAM) 512 to determine whether the receiver 500 is permitted to access certain program material. Data from the transport module 508 can also be supplied to external communication module 526.

The CAM 512 functions in association with other elements to decode an encrypted signal from the transport module 508. The CAM 512 may also be used for tracking and billing these services. In one embodiment of the present invention, the CAM 512 is a removable smart card, having contacts cooperatively interacting with contacts in the IRD 500 to pass information. In order to implement the processing performed in the CAM 512, the IRD 500, and specifically the transport module 508 provides a clock signal to the CAM 512.

Video data is processed by the MPEG video decoder 514. Using the video random access memory (RAM) 536, the MPEG video decoder 514 decodes the compressed video data and sends it to an encoder or video processor 516, which converts the digital video information received from the video MPEG module 514 into an output signal usable by a display or other output device. By way of example, processor 516 may comprise a National TV Standards Committee (NTSC) or Advanced Television Systems Committee (ATSC) encoder. In one embodiment of the invention both S-Video and ordinary video (NTSC or ATSC) signals are provided. Other outputs may also be utilized, and are advantageous if high definition programming is processed.

Audio data is likewise decoded by the MPEG audio decoder 517. The decoded audio data may then be sent to a digital to analog (D/A) converter 518. In one embodiment of the present invention, the D/A converter 518 is a dual D/A converter, one for the right and left channels. If desired, additional channels can be added for use in surround sound processing or secondary audio programs (SAPs). In one embodiment of the invention, the dual D/A converter 518 itself separates the left and right channel information, as well as any additional channel information. Other audio formats may similarly be supported. For example, other audio formats such as multi-channel DOLBY DIGITAL AC-3 may be supported.

A description of the processes performed in the encoding and decoding of video streams, particularly with respect to MPEG and JPEG encoding/decoding, can be found in Chapter 8 of "Digital Television Fundamentals," by Michael Robin and Michel Poulin, McGraw-Hill, 1998, which is hereby incorporated by reference herein.

The microcontroller 510 receives and processes command signals from a remote control, an IRD 500 keyboard interface, and/or other suitable input device 524. The microcontroller 510 receives commands for performing its operations from a processor programming memory, which permanently stores such instructions for performing such commands. The processor programming memory may comprise a read only memory (ROM) 538, an electrically erasable programmable read only memory (EEPROM) 522 or, similar memory device. The microcontroller 510 also controls the other digital devices of the IRD 500 via address and data lines (denoted "A" and "D" respectively, in FIG. 5).

The modem 540 connects to the customer's phone line via the PSTN port 120. It calls, e.g. the program provider, and transmits the customer's purchase information for billing purposes, and/or other information. The modem 540 is controlled by the microprocessor 510. The modem 540 can output data to other I/O port types including standard parallel and serial computer I/O ports.

The present invention also is comprised of a local storage unit such as the video storage device 532 for storing video and/or audio data obtained from the transport module 508. Video storage device 532 can be a hard disk drive, a read/writable compact disc of DVD, a solid state RAM, or any other suitable storage medium. In one embodiment of the present invention, the video storage device 532 is a hard disk drive with specialized parallel read/write capability so that data may be read from the video storage device 532 and written to the device 532 at the same time. To accomplish this feat, additional buffer memory accessible by the video storage 532 or its controller may be used. Optionally, a video storage processor 530 can be used to manage the storage and retrieval of the video data from the video storage device 532. The video storage processor 530 may also comprise memory for buffering data passing into and out of the video storage device 532. Alternatively or in combination with the foregoing, a plurality of video storage devices 532 can be used. Also alternatively or in combination with the foregoing, the microcontroller 510 can also perform the operations required to store and or retrieve video and other data in the video storage device 532.

The video processing module 516 input can be directly supplied as a video output to a viewing device such as a video or computer monitor. In addition, the video and/or audio outputs can be supplied to an RF modulator 534 to produce an RF output and/or 8 vestigal side band (VSB) suitable as an input signal to a conventional television tuner. This allows the receiver 500 to operate with televisions without a video output.

Each of the satellites 108 is comprised of a transponder, which accepts program information from the uplink center 104, and relays this information to the subscriber receiving station 110. Known multiplexing techniques are used so that multiple channels can be provided to the user. These multiplexing techniques include, by way of example, various statistical or other time domain multiplexing techniques and polarization multiplexing. In one embodiment of the invention, a single transponder operating at a single frequency band carries a plurality of channels identified by respective service channel identification (SCID).

Preferably, the IRD 500 also receives and stores a program guide in a memory available to the microcontroller 510. Typically, the program guide is received in one or more data packets in the data stream from the satellite 108. The program guide can be accessed and searched by the execution of suitable operation steps implemented by the microcontroller 510 and stored in the processor ROM 538. The program guide may include data to map viewer channel numbers to satellite transponders and service channel identifications (SCIDs), and also provide TV program listing information to the subscriber 122 identifying program events.

The functionality implemented in the IRD 500 depicted in FIG. 5 can be implemented by one or more hardware modules, one or more software modules defining instructions performed by a processor, or a combination of both.

The present invention provides for the modulation of signals at different power levels and advantageously for the signals to be non-coherent from each layer. In addition, independent modulation and coding of the signals may be performed. Backwards compatibility with legacy receivers, such as a quadrature phase shift keying (QPSK) receiver is enabled and new services are provided to new receivers. A typical new receiver of the present invention uses two demodulators and one remodulator as will be described in detail hereafter.

In a typical backwards-compatible embodiment of the present invention, the legacy QPSK signal is boosted in power to a higher transmission (and reception) level. This creates a power "room" in which a new lower layer signal may operate.

The legacy receiver will not be able to distinguish the new lower layer signal, from additive white Gaussian noise, and thus operates in the usual manner. The optimum selection of the layer power levels is based on accommodating the legacy equipment, as well as the desired new throughput and services.

The new lower layer signal is provided with a sufficient carrier to thermal noise ratio to function properly. The new lower layer signal and the boosted legacy signal are non-coherent with respect to each other. Therefore, the new lower layer signal can be implemented from a different TWTA and even from a different satellite. The new lower layer signal format is also independent of the legacy format, e.g., it may be QPSK or 8PSK, using the conventional concatenated FEC code or using a new Turbo code. The lower layer signal may even be an analog signal.

The combined layered signal is demodulated and decoded by first demodulating the upper layer to remove the upper carrier. The stabilized layered signal may then have the upper layer FEC decoded and the output upper layer symbols communicated to the upper layer transport. The upper layer symbols are also employed in a remodulator, to generate an idealized upper layer signal. The idealized upper layer signal is then subtracted from the stable layered signal to reveal the lower layer signal. The lower layer signal is then demodulated and FEC decoded and communicated to the lower layer transport.

Signals, systems and methods using the present invention may be used to supplement a pre-existing transmission compatible with legacy receiving hardware in a backwards-compatible application or as part of a preplanned layered modulation architecture providing one or more additional layers at a present or at a later date.

2.4 Layered Signals

Figure 6B:
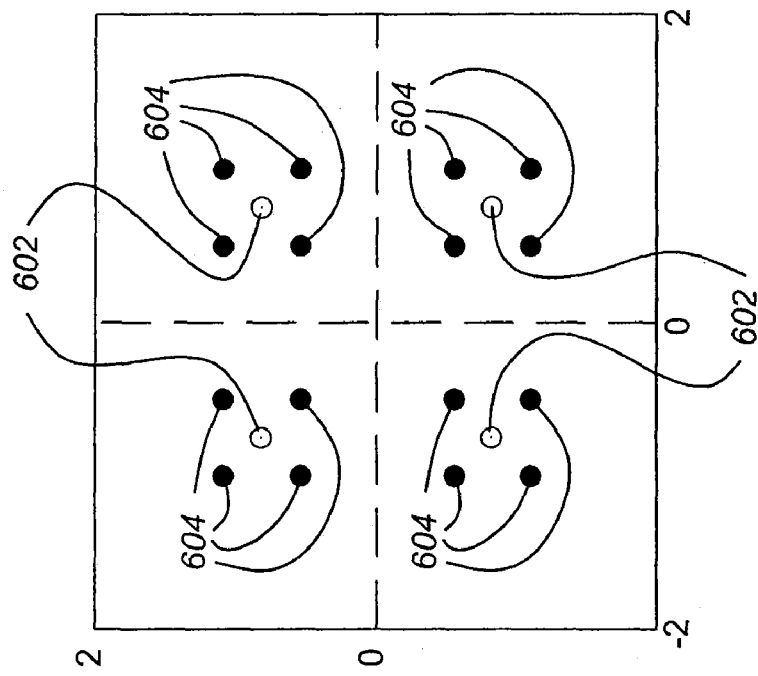
FIGS. 6A-6C are diagrams illustrating the basic relationship of signal layers in a layered modulation transmission.
Figure 6A:
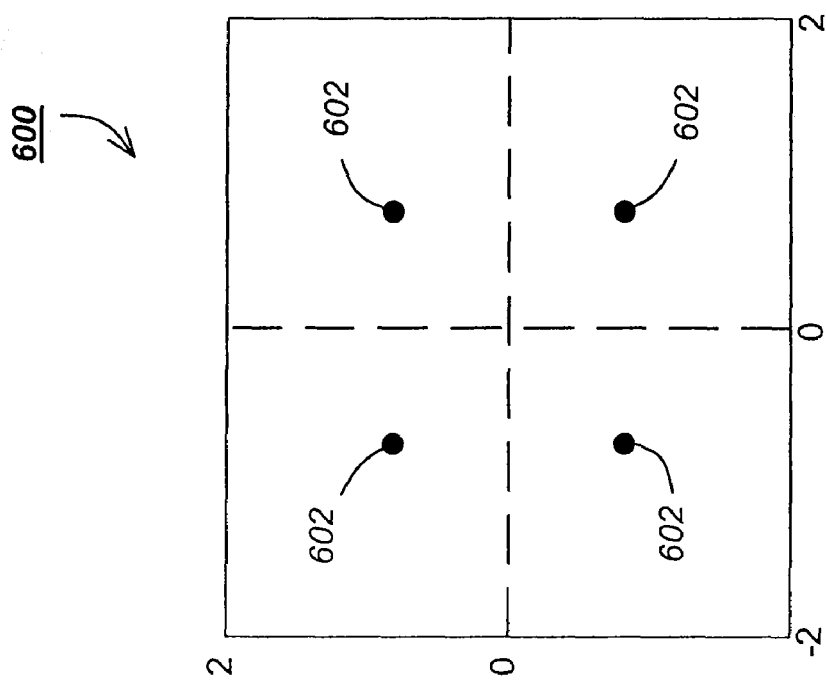
Figure 6C:
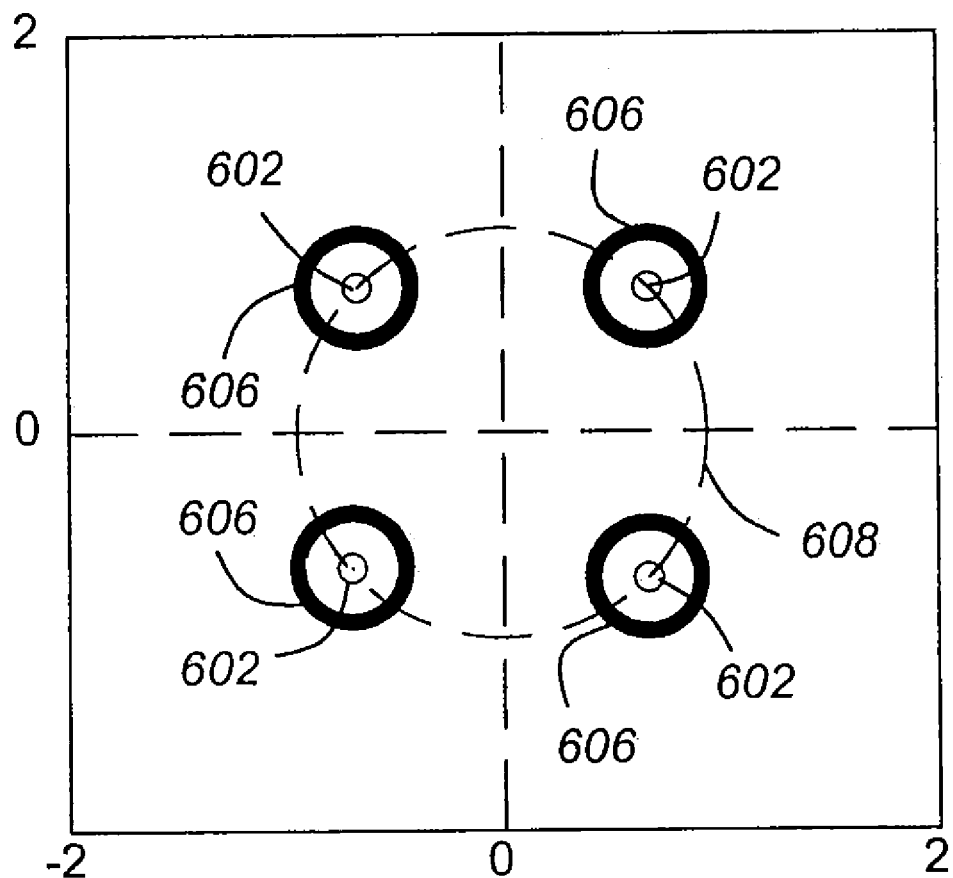

FIGS. 6A-6C illustrate the basic relationship of signal layers in a received layered modulation transmission. FIG. 6A illustrates an upper layer signal constellation 600 of a transmission signal showing the signal points or symbols 602. FIG. 6B illustrates the lower layer signal constellation of symbols 604 over the upper layer signal constellation 600 where the layers are coherent (or synchronized). FIG. 6C illustrates a lower layer signal 606 of a second transmission layer over the upper layer constellation where the layers are non-coherent. The lower layer 606 rotates about the upper layer constellation 602 due to the relative modulating frequencies of the two layers in a non-coherent transmission. Both the upper and lower layers rotate about the origin due to the first layer modulation frequency as described by path 608.

Figure 7C:
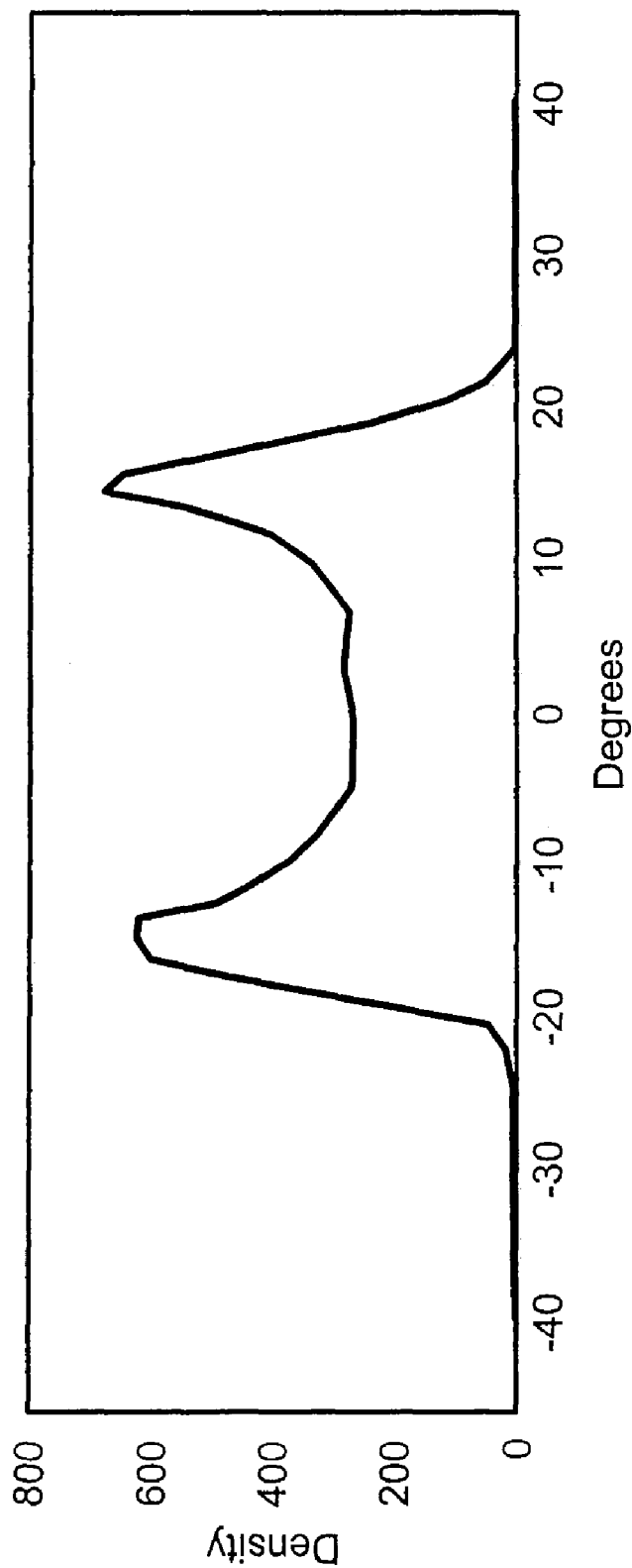

FIGS. 7A-7C are diagrams illustrating a non-coherent relationship between a lower transmission layer over the upper transmission layer after upper layer demodulation. FIG. 7A shows the constellation 700 before the first carrier recovery loop (CRL) of the upper layer and The constellation rings 702 rotate around the large radius circle indicated by the dashed line. FIG. 7B shows the constellation 704 after CRL of the upper layer where the rotation of the constellation rings 702 is stopped. The constellation rings 702 are the signal points of the lower layer around the nodes 602 of the upper layer. FIG. 7C depicts a phase distribution of the received signal with respect to nodes 602.

Relative modulating frequencies of the non-coherent upper and lower layer signals cause the lower layer constellation to rotate around the nodes 602 of the upper layer constellation to form rings 702. After the lower layer CRL this rotation is eliminated and the nodes of the lower layer are revealed (as shown in FIG. 6B). The radius of the lower layer constellation rings 702 is indicative of the lower layer power level. The thickness of the rings 702 is indicative of the carrier to noise ratio (CNR) of the lower layer. As the two layers are non-coherent, the lower layer may be used to transmit distinct digital or analog signals.

Figure 8A:
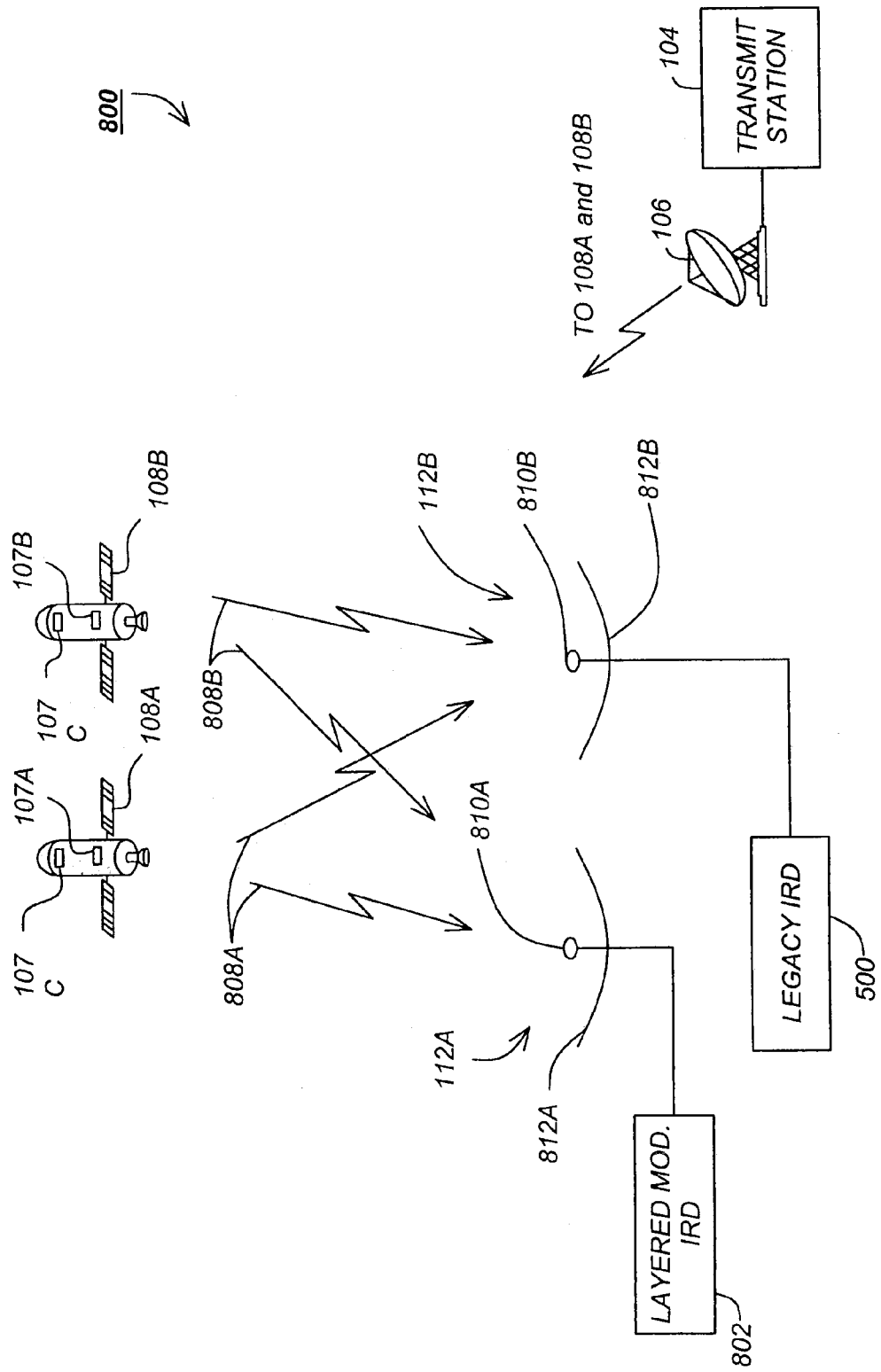
FIG. 8A is a diagram showing a system for transmitting and receiving layered modulation signals.

FIG. 8A is a diagram showing a system for transmitting and receiving layered modulation signals. Separate transmitters 107A, 107B (which include TWTAs to amplify the signals), as may be located on any suitable platform, such as satellites 108A, 108B, are used to non-coherently transmit different layers of a signal of the present invention. Each satellite includes additional transmitters 107C, 107D which can be used to transmit additional signals (from additional received uplink signals) to be used in the frequency bandwidth of the layered signal as detailed hereafter. Uplink signals 116 are typically transmitted to each satellite 108A, 108B from one or more uplink centers 104 with one or more transmitters 105 via an antenna 106.

Figure 8B:
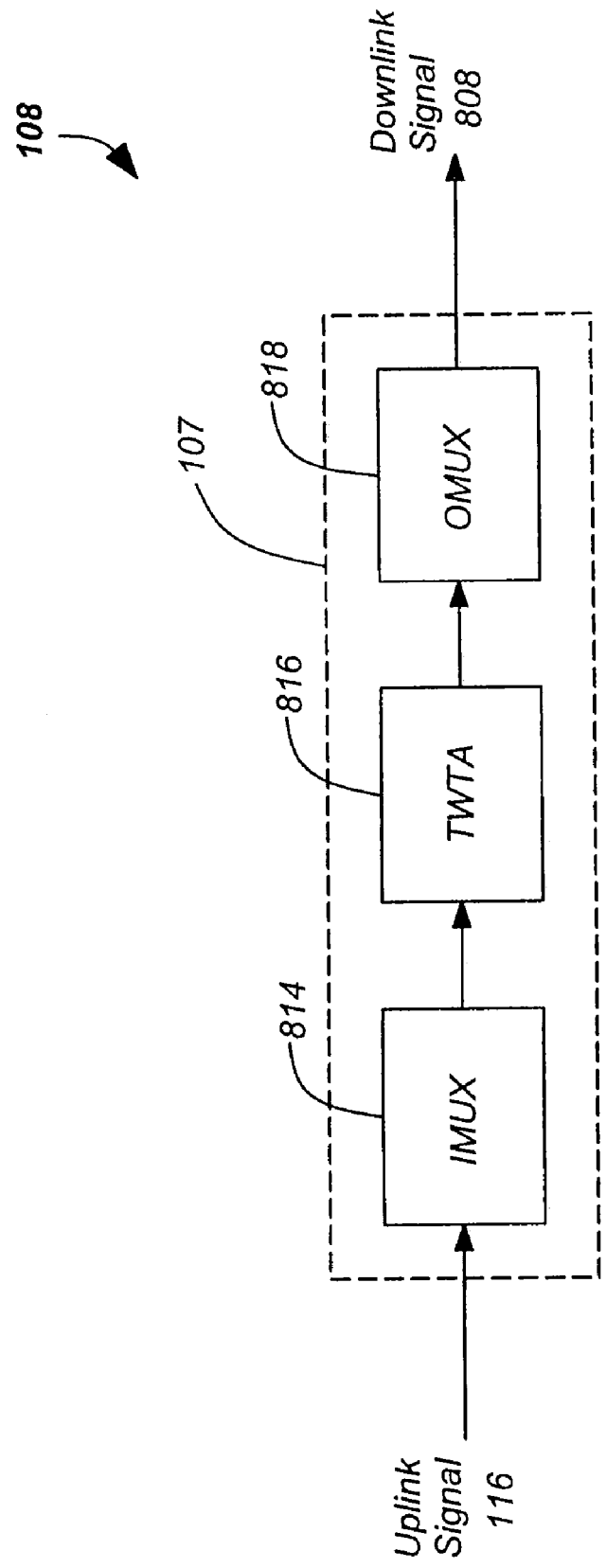
FIG. 8B is a diagram showing an exemplary satellite transponder for receiving and transmitting layered modulation signals.

FIG. 8B is a diagram illustrating an exemplary satellite transponder 107 for receiving and transmitting layered modulation signals on a satellite 108. The uplink signal 116 is received by the satellite 108 and passed through a input multiplexer (IMUX) 814. Following this the signal is amplified with a travelling wave tube amplifier (TWTA) 816 and then through an output muliplexer (OMUX) 818 before the downlink signal 118 is transmitted to the receivers 802, 500.

The layered signals 808A, 808B (e.g. multiple downlink signals 118) are received at receiver antennas 812A, 812B, such as satellite dishes, each with a low noise block (LNB) 810A, 810B where they are then coupled to integrated receiver/decoders (IRDs) 500, 802. For example, first satellite 108A and transmitter 107A can transmit an upper layer legacy signal 808A and second satellite 108B and transmitter 107B can transmit a lower layer signal 808B. Although both signals 808A, 808B arrive at each antenna 812A, 812B and LNB 810A, 810B, only the layer modulation IRD 802 is capable of decoding both signals 808A, 808B. The legacy receiver 500 is only capable of decoding the upper layer legacy signal 808A; the lower layer signal 808B appears only as noise to the legacy receiver 500.

Because the signal layers can be transmitted non-coherently, separate transmission layers may be added at any time using different satellites 108A, 108B or other suitable platforms, such as ground-based or high altitude platforms. Thus, any composite signal, including new additional signal layers will be backwards compatible with legacy receivers 500, which will disregard the new signal layers. To ensure that the signals do not interfere, the combined signal and noise level for the lower layer must be at or below the allowed noise floor for the upper layer at the particular receiver antenna 812A, 812B.

Layered modulation applications include backwards compatible and non-backwards compatible applications. "Backwards compatible" in this sense, describes systems in which legacy receivers 500 are not rendered obsolete by the additional signal layer(s). Instead, even if the legacy receivers 500 are incapable of decoding the additional signal layer(s), they are capable of receiving the layered modulated signal and decoding the original signal layer. In these applications, the pre-existing system architecture is accommodated by the architecture of the additional signal layers. "Non-backwards compatible" describes a system architecture which makes use of layered modulation, but the modulation scheme employed is such that pre-existing equipment is incapable of receiving and decoding the information on additional signal layer(s).

The pre-existing legacy IRDs 500 decode and make use of data only from the layer (or layers) they were designed to receive, unaffected by the additional layers. However, as will be described hereafter, the legacy signals may be modified to optimally implement the new layers. The present invention may be applied to existing direct satellite services which are broadcast to individual users in order to enable additional features and services with new receivers without adversely affecting legacy receivers and without requiring additional signal frequency.

2.5 Demodulator and Decoder

Figure 9:
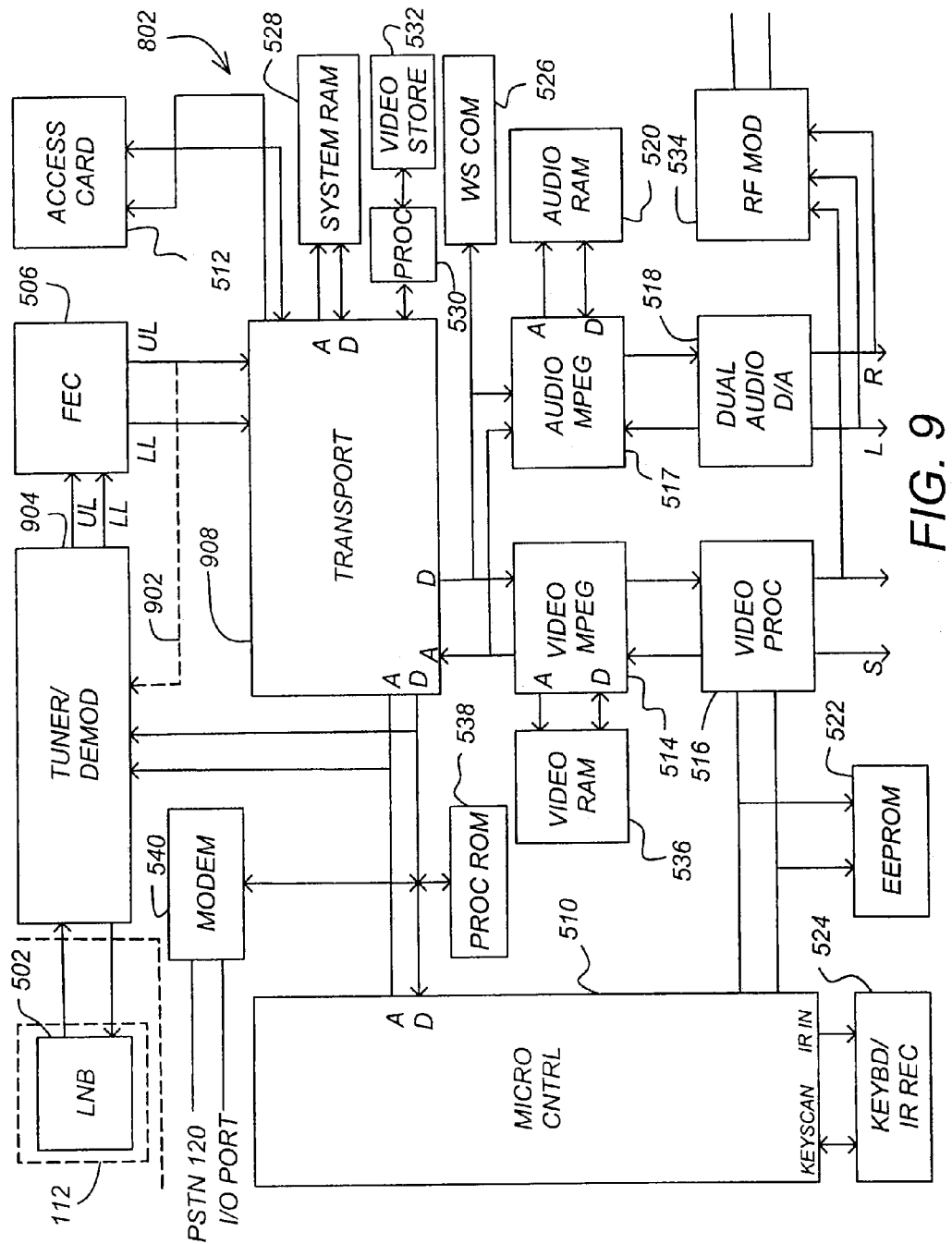
FIG. 9 is a block diagram depicting one embodiment of an enhanced IRD capable of receiving layered modulation signals.

FIG. 9 is a block diagram depicting one embodiment of an enhanced IRD 802 capable of receiving layered modulation signals. The IRD includes many similar components as that of the legacy IRD 500 of FIG. 5. However, the enhanced IRD 802 includes a feedback path 902 in which the FEC decoded symbols are fed back to a enhanced modified tuner/demodulator 904 and transport module 908 for decoding both signal layers as detailed hereafter.

Figure 10A:
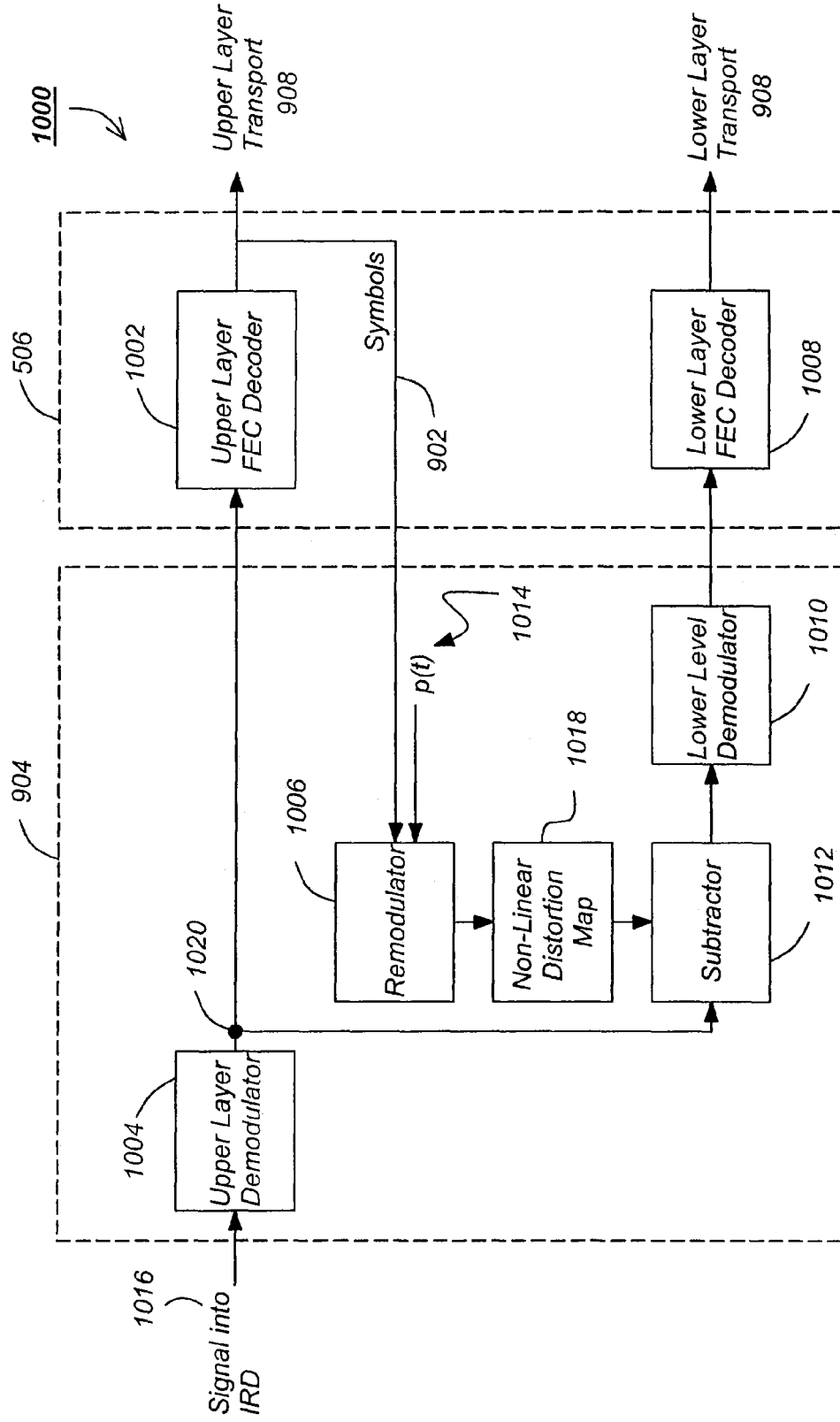
FIG. 10A is a block diagram of one embodiment of the enhanced tuner/modulator and FEC encoder.

FIG. 10A is a block diagram of one embodiment of the enhanced tuner/modulator 904 and FEC encoder 506. FIG. 10A depicts reception where layer subtraction is performed on a signal where the upper layer carrier has already been demodulated. The upper layer of the received combined signal 1016 from the LNB 502, which may contain legacy modulation format, is provided to and processed by an upper layer demodulator 1004 to produce the stable demodulated signal 1020. The demodulated signal 420 is communicatively coupled to a FEC decoder 402 which decodes the upper layer to produce the upper layer symbols which are output to an upper layer transport module 908. The upper layer symbols are also used to generate an idealized upper layer signal. The upper layer symbols may be produced from the decoder 402 after Viterbi decode (BER<$10^{-3}$ or so) or after Reed-Solomon (RS) decode (BER<$10^{-9}$ or so), in typical decoding operations known to those skilled in the art. The upper layer symbols are provided via feedback path 902 from the upper layer decoder 402 to a remodulator 406 which effectively produces an idealized upper layer signal. The idealized upper level signal is subtracted from the demodulated upper layer signal 1020.

In order for the subtraction to yield a clean small lower layer signal, the upper layer signal must be precisely reproduced. The modulated signal may have been distorted, for example, by traveling wave tube amplifier (TWTA) non-linearity or other non-linear or linear distortions in the transmission channel. The distortion effects are estimated from the received signal after the fact or from TWTA characteristics which may be downloaded into the IRD in AM-AM and/or AM-PM maps 1014, used to eliminate the distortion.

A subtractor 1012 then subtracts the idealized upper layer signal from the stable demodulated signal 1020. This leaves the lower-power second layer signal. The subtractor 1012 may include a buffer or delay function to retain the stable demodulated signal 1020 while the idealized upper layer signal is being constructed. The second layer signal is demodulated by the lower level demodulator 1010 and FEC decoded by decoder 1008 according to its signal format to produce the lower layer symbols, which are provided to the transport module 908.

Figure 10B:
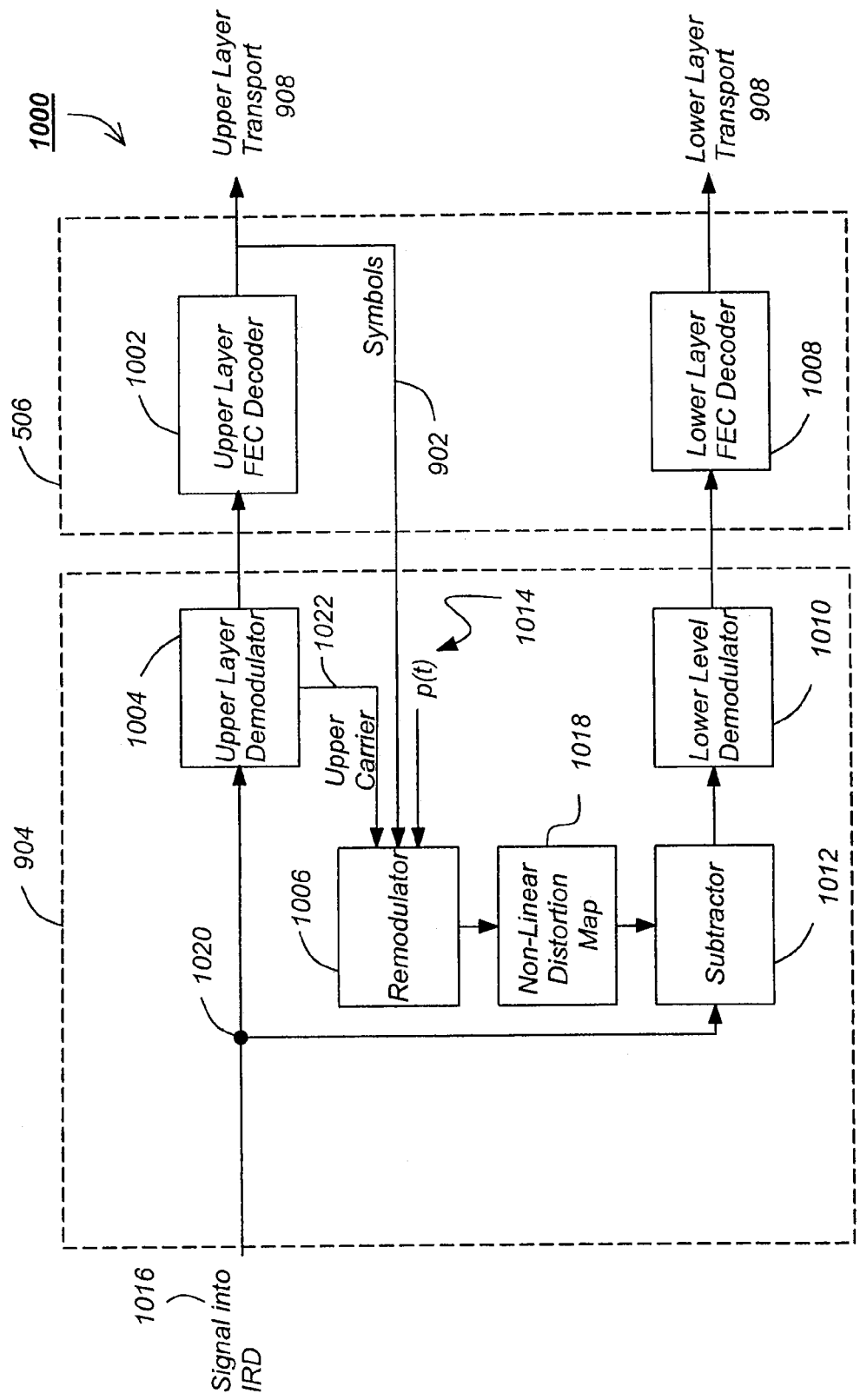
FIG. 10B depicts another embodiment of the enhanced tuner/modulator wherein layer subtraction is performed on the received layered signal.

FIG. 10B depicts another embodiment wherein layer subtraction is performed on the received layered signal (prior to upper layer demodulation). In this case, the upper layer demodulator 1004 produces the upper carrier signal 1022 (as well as the stable demodulated signal output 1020). An upper carrier signal 1022 is provided to the remodulator 1006. The remodulator 1006 provides the remodulated signal to the non-linear distortion mapper 1018 which effectively produces an idealized upper layer signal. Unlike the embodiment shown in FIG. 10A, in this embodiment the idealized upper layer signal includes the upper layer carrier for subtraction from the received combined signal 808A, 808B.

Other equivalent methods of layer subtraction will occur to those skilled in the art and the present invention should not be limited to the examples provided here. Furthermore, those skilled in the art will understand that the present invention is not limited to two layers; additional layers may be included. Idealized upper layers are produced through remodulation from their respective layer symbols and subtracted. Subtraction may be performed on either the received combined signal or a demodulated signal. Finally, it is not necessary for all signal layers to be digital transmissions; the lowest layer may be an analog transmission.

The following analysis describes the exemplary two layer demodulation and decoding. It will be apparent to those skilled in the art that additional layers may be demodulated and decoded in a similar manner. The incoming combined signal is represented as:

$$s_{UL}(t) = f_U\left(M_U \exp(j\omega_U t + \theta_U) \sum_{m=-\infty}^{\infty} S_{Um} p(t - mT)\right) +$$
$$f_L\left(M_L \exp(j\omega_L t + \theta_L) \sum_{m=-\infty}^{\infty} S_{Lm} p(t - mT + \Delta T_m)\right) + n(t)$$

where, $M_U$ is the magnitude of the upper layer QPSK signal and $M_L$ is the magnitude of the lower layer QPSK signal and $M_L \ll M_U$. The signal frequencies and phase for the upper and lower layer signals are respectively $\omega_U, \theta_U$ and $\omega_U, \theta_U$. The symbol timing misalignment between the upper and lower layers is $\Delta T_m$. $p(t-mT)$ represents the time shifted version of the pulse shaping filter $p(t)$ 414 employed in signal modulation. QPSK symbols $S_{Um}$ and $S_{Lm}$ are elements of $$\left\{\exp\left(j\frac{n\pi}{2}\right), n = 0, 1, 2, 3\right\}.$$

$f_U(\bullet)$ and $f_L(\bullet)$ denote the distortion function of the TWTAs for the respective signals.

Ignoring $f_U(\bullet)$ and $f_L(\bullet)$ and noise $n(t)$, the following represents the output of the demodulator 1004 to the FEC decoder 1002 after removing the upper carrier:

$$s'_{UL}(t) = M_U \sum_{m=-\infty}^{\infty} S_{Um} p(t - mT) +$$
$$M_L \exp\{j(\omega_L - \omega_U)t + \theta_L - \theta_U\} \sum_{m=-\infty}^{\infty} S_{Lm} p(t - mT + \Delta T_m)$$

Because of the magnitude difference between $M_U$ and $M_L$, the upper layer decoder 402 disregards the $M_L$ component of the $s'_{UL}(t)$.

After subtracting the upper layer from $s_{UL}(t)$ in the subtractor 1012, the following remains:

$$s_L(t) = M_L \exp\{j(\omega_L - \omega_U)t + \theta_L - \theta_U\} \sum_{m=-\infty}^{\infty} S_{Lm} p(t - mT + \Delta T_m)$$

Any distortion effects, such as TWTA nonlinearity effects are estimated for signal subtraction. In a typical embodiment of the present invention, the upper and lower layer frequencies are substantially equal. Significant improvements in system efficiency can be obtained by using a frequency offset between layers.

Using the present invention, two-layered backward compatible modulation with QPSK doubles a current 6/7 rate capacity by adding a TWTA approximately 6.2 dB above an existing TWTA power. New QPSK signals may be transmitted from a separate transmitter, from a different satellite for example. In addition, there is no need for linear travelling wave tube amplifiers (TWTAs) as with 16QAM. Also, no phase error penalty is imposed on higher order modulations such as 8PSK and 16QAM.

3.0 Power Levels of Modulation Layers

In a layered modulation system, the relationship between the individual modulation layers can be structured to facilitate backward compatible applications. Alternately, a new layer structure can be designed to optimize the combined efficiency and/or performance of the layered modulation system.

3.1 Backward Compatible Applications

Figure 11A:
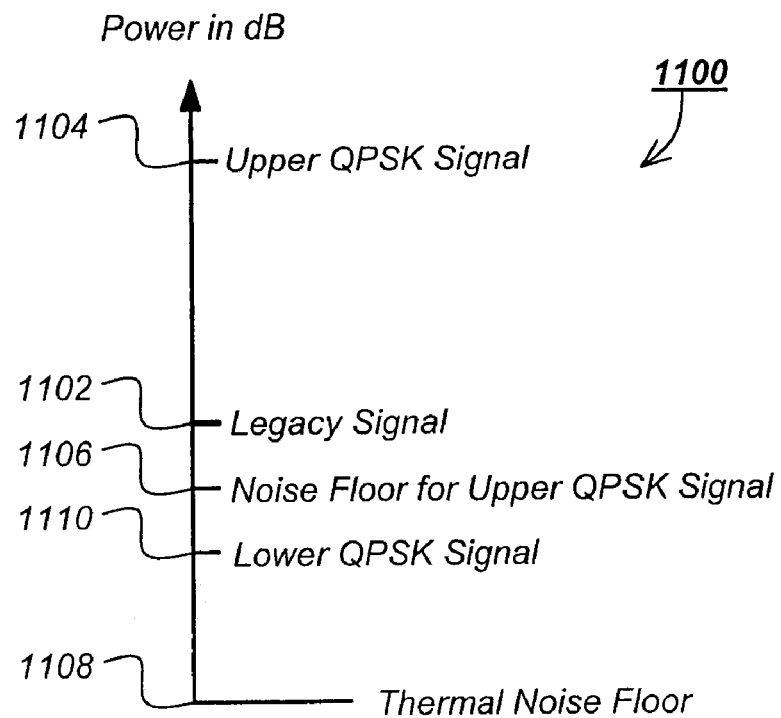
FIG. 11A depicts the relative power levels of example embodiments of the present invention.

FIG. 11A depicts the relative power levels 1100 of example embodiments of the present invention. FIG. 11A is not a scale drawing. This embodiment doubles the pre-existing rate 6/7 capacity by using a TWTA 6.2 dB above a pre-existing TWTA equivalent isotropic radiated power (EIRP) and second TWTA 2 dB below the pre-existing TWTA power. This embodiment uses upper and lower QPSK layers which are non-coherent. A code rate of 6/7 is also used for both layers. In this embodiment, the signal of the legacy QPSK signal 1102 is used to generate the upper layer 1104 and a new QPSK layer is the lower layer 1110. The CNR of the legacy QPSK signal 1102 is approximately 7 dB. In the present invention, the legacy QPSK signal 1102 is boosted in power by approximately 6.2 dB bringing the new power level to approximately 13.2 dB as the upper layer 1104. The noise floor 1106 of the upper layer is approximately 6.2 dB. The new lower QPSK layer 1110 has a CNR of approximately 5 dB. The total signal and noise of the lower layer is kept at or below the tolerable noise floor 1106 of the upper layer. The power boosted upper layer 1104 of the present invention is also very robust, making it resistant to rain fade. It should be noted that the invention may be extended to multiple layers with mixed modulations, coding and code rates.

In an alternate embodiment of this backwards compatible application, a code rate of 2/3 may be used for both the upper and lower layers 1104, 1110. In this case, the CNR of the legacy QPSK signal 1102 (with a code rate of 2/3) is approximately 5.8 dB. The legacy signal 1102 is boosted by approximately 5.3 dB to approximately 11.1 dB (4.1 dB above the legacy QPSK signal 1102 with a code rate of 2/3) to form the upper QPSK layer 1104. The new lower QPSK layer 1110 has a CNR of approximately 3.8 dB. The total signal and noise of the lower layer 1110 is kept at or below approximately 5.3 dB, the tolerable noise floor 1106 of the upper QPSK layer. In this case, overall capacity is improved by 1.55 and the effective rate for legacy IRDs will be 7/9 of that before implementing the layered modulation.

In a further embodiment of a backwards compatible application of the present invention the code rates between the upper and lower layers 1104, 1110 may be mixed. For example, the legacy QPSK signal 502 may be boosted by approximately 5.3 dB to approximately 12.3 dB with the code rate unchanged at 6/7 to create the upper QPSK layer 1104. The new lower QPSK layer 1110 may use a code rate of 2/3 with a CNR of approximately 3.8 dB. In this case, the total capacity relative to the legacy signal 1102 is approximately 1.78. In addition, the legacy IRDs will suffer no significant rate decrease.

3.2 Non-Backward Compatible Applications

As previously discussed the present invention may also be used in "non-backward compatible" applications. In a first example embodiment, two QPSK layers 1104, 1110 are used each at a code rate of 2/3. The upper QPSK layer 504 has a CNR of approximately 4.1 dB above its noise floor 1106 and the lower QPSK layer 1110 also has a CNR of approximately 4.1 dB. The total code and noise level of the lower QPSK layer 1110 is approximately 5.5 dB. The total CNR for the upper QPSK signal 1104 is approximately 9.4 dB, merely 2.4 dB above the legacy QPSK signal rate 6/7. The capacity is approximately 1.74 compared to the legacy rate 6/7.

Figure 11B:
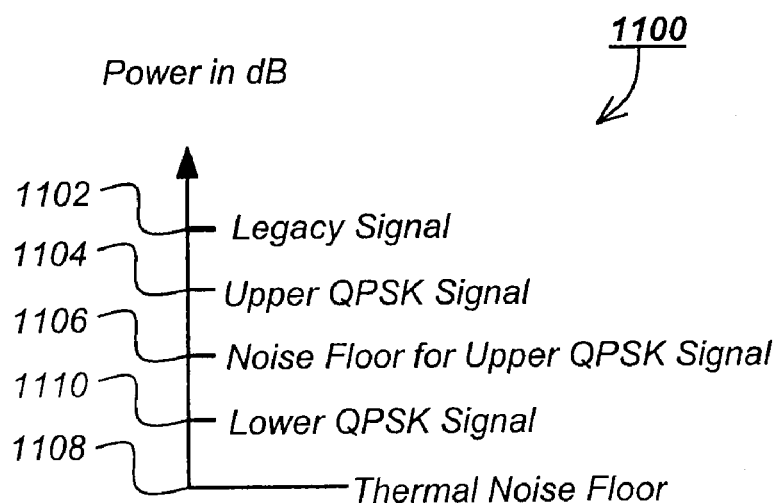
FIG. 11B depicts the relative power level of an alternate embodiment.

FIG. 11B depicts the relative power levels of an alternate embodiment wherein both the upper and lower layers 1104, 1110 are below the legacy signal level 1102. The two QPSK layers 1104, 1110 use a code rate of 1/2. In this example, the upper QPSK layer 1104 is approximately 2.0 dB above its noise floor 1106 of approximately 4.1 dB. The lower QPSK layer has a CNR of approximately 2.0 dB and a total code and noise level at or below 4.1 dB. The capacity of this embodiment is approximately 1.31 compared to the legacy rate 6/7.

4. Hardware Environment

Figure 12:
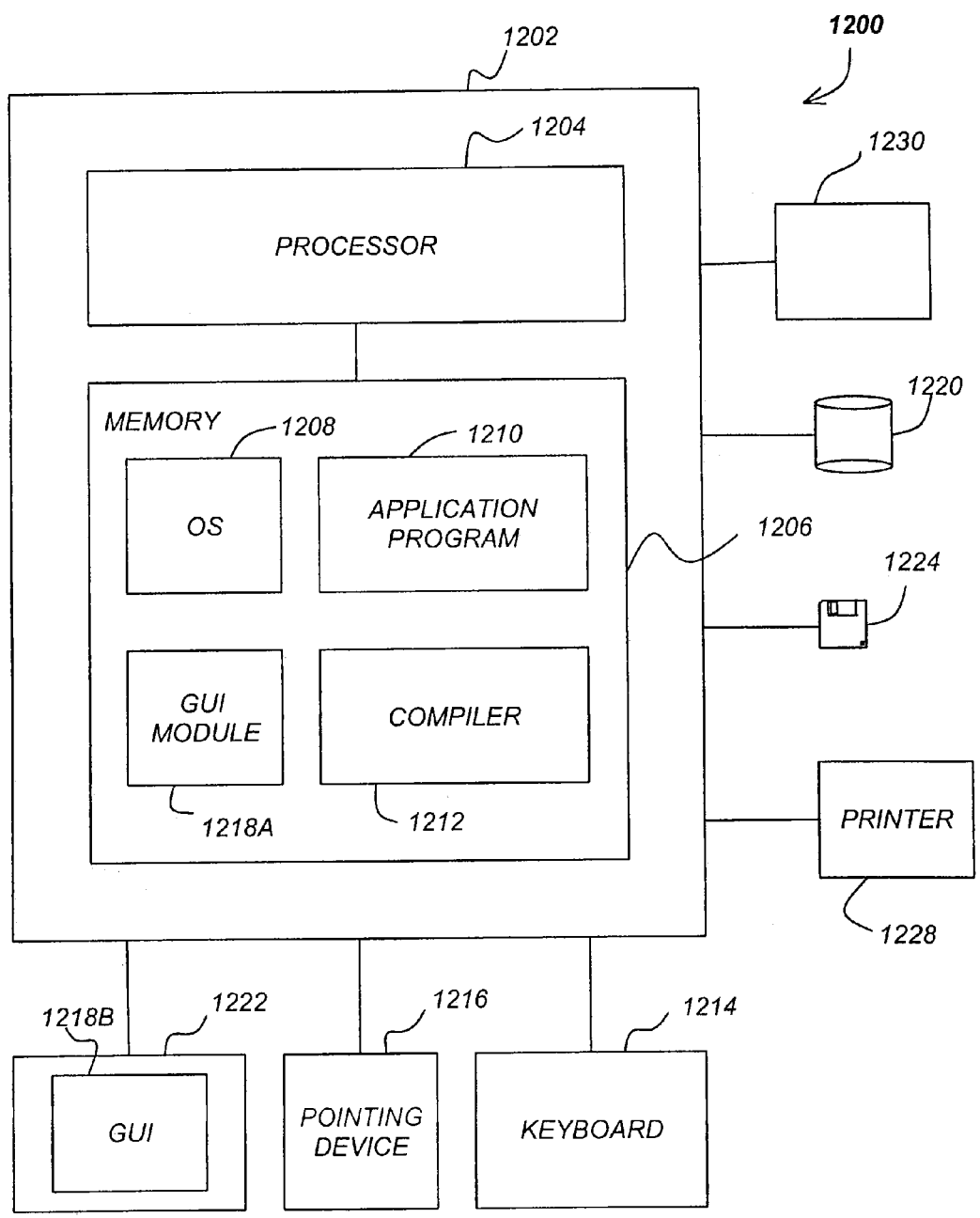
FIG. 12 illustrates an exemplary computer system that could be used to implement selected modules or functions the present invention.

FIG. 12 illustrates an exemplary computer system 1200 that could be used to implement selected modules and/or functions of the present invention. The computer 1202 is comprised of a processor 1204 and a memory 1206, such as random access memory (RAM). The computer 1202 is operatively coupled to a display 1222, which presents images such as windows to the user on a graphical user interface 1218B. The computer 1202 may be coupled to other devices, such as a keyboard 1214, a mouse device 1216, a printer, etc. Of course, those skilled in the art will recognize that any combination of the above components, or any number of different components, peripherals, and other devices, may be used with the computer 1202.

Generally, the computer 1202 operates under control of an operating system 1208 stored in the memory 1206, and interfaces with the user to accept inputs and commands and to present results through a graphical user interface (GUI) module 1218A. Although the GUI module 1218A is depicted as a separate module, the instructions performing the GUI functions can be resident or distributed in the operating system 1208, the computer program 1210, or implemented with special purpose memory and processors. The computer 1202 also implements a compiler 1212 which allows an application program 1210 written in a programming language such as COBOL, C++, FORTRAN, or other language to be translated into processor 1204 readable code. After completion, the application 1210 accesses and manipulates data stored in the memory 1206 of the computer 1202 using the relationships and logic that was generated using the compiler 1212. The computer 1202 also optionally is comprised of an external communication device such as a modem, satellite link, Ethernet card, or other device for communicating with other computers.

In one embodiment, instructions implementing the operating system 1208, the computer program 1210, and the compiler 1212 are tangibly embodied in a computer-readable medium, e.g., data storage device 1220, which could include one or more fixed or removable data storage devices, such as a zip drive, floppy disc drive 1224, hard drive, CD-ROM drive, tape drive, etc. Further, the operating system 1208 and the computer program 1210 are comprised of instructions which, when read and executed by the computer 1202, causes the computer 1202 to perform the steps necessary to implement and/or use the present invention. Computer program 1210 and/or operating instructions may also be tangibly embodied in memory 1206 and/or data communications devices 1230, thereby making a computer program product or article of manufacture according to the invention. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present invention. For example, those skilled in the art will recognize that any combination of the above components, or any number of different components, peripherals, and other devices, may be used with the present invention.

5. Modulation Schemes for Maximizing Power and Spectral Efficiency

The layered modulation (LM) technique described above typically requires the use of transmitters of transponders in satellites 108A, 108B, with the upper layer transponder having greater power output than those associated with ordinary modulation techniques. Typically, the upper signal layer 808A must be modulated by a carrier of substantially higher power than the lower signal layer 808B. Also, backwards compatible (BWC) applications typically require more power than non-BWC applications for the upper signal layer 808A.

Embodiments of the present invention utilize one or more of four defined signal schemes to improve the power and spectral efficiency of system. Such improvements allow for layered modulation systems to operate at conventional TWTA power levels. The four signal schemes are described in detail below. The signal schemes can be employed separately or in combination to achieve improved performance. In the first signal scheme, the symbol rate of the lower layer signal is reduced below the symbol rate of the upper layer signal (or vice versa if non-backwards compatible). In the second signal scheme, the guard band providing against adjacent channel interference is reduced or eliminated. In the third signal scheme, the excess signal bandwidth ratio, α, is reduced. In the last signal scheme, multiple signal layers can be used to provide a new data stream in the guard band of the legacy signal.

Figure 13:
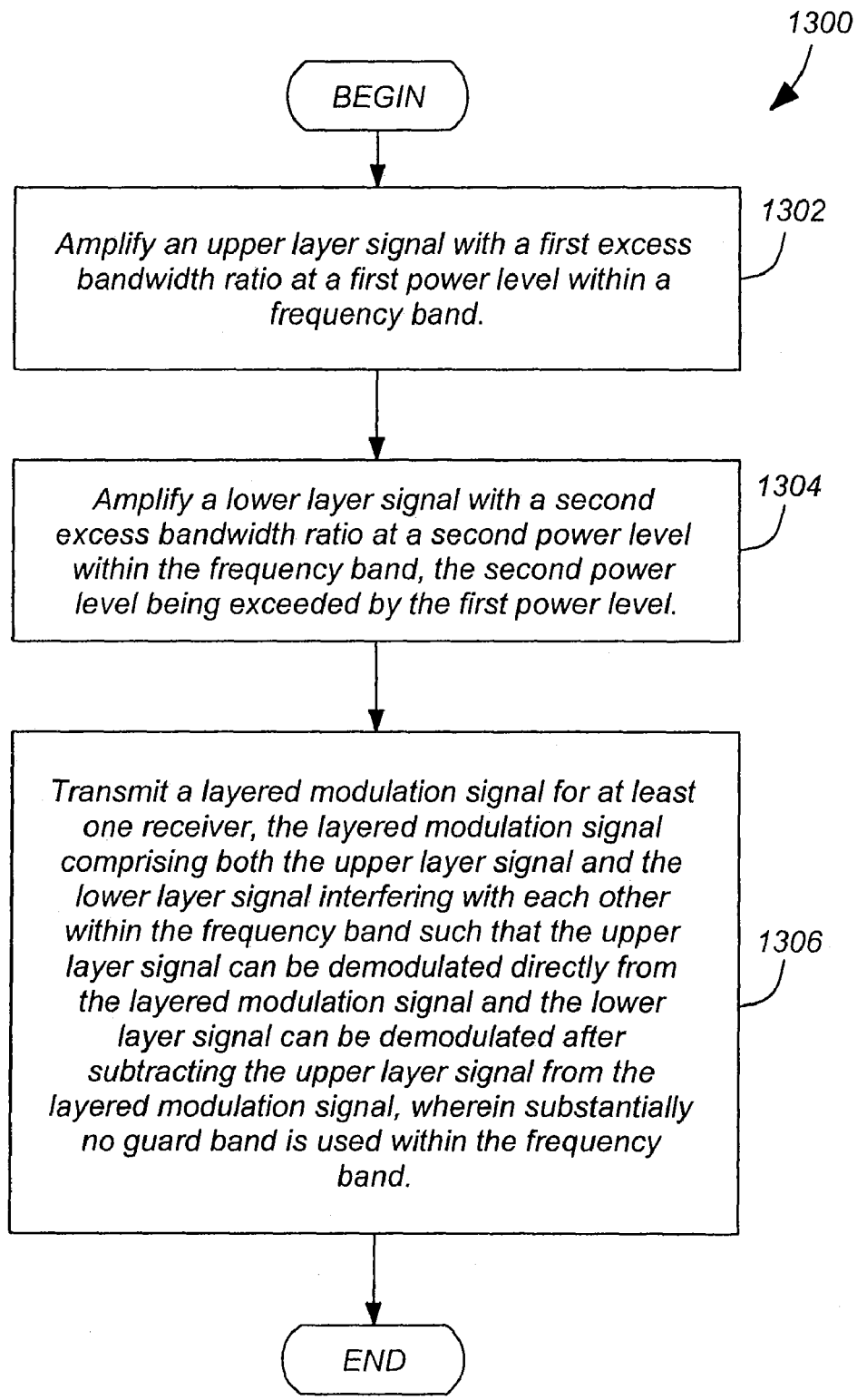
FIG. 13 is a diagram illustrating exemplary method steps that can be used to practice one embodiment of the invention.

FIG. 13 is a diagram illustrating an exemplary method 1300 that can be used to practice one embodiment of the invention. At step 1302, an upper layer signal is amplified with a first excess bandwidth ratio at a first power level within a frequency band. At step 1304, a lower layer signal is amplified with a second excess bandwidth ratio at a second power level within the frequency band, the second power level being exceeded by the first power level. Finally, at step 1306, a layered modulation signal is transmitted for at least one receiver, the layered modulation signal comprising both the upper layer signal and the lower layer signal interfering with each other within the frequency band such that the upper layer signal can be demodulated directly from the layered modulation signal and the lower layer signal can be demodulated after subtracting the upper layer signal from the layered modulation signal, wherein substantially no guard band is used within the frequency band. The foregoing method can be applied to implement the signal schemes described hereafter in the system architecture detailed above.

Typically, the upper layer signal comprises a legacy signal in a satellite television system that has a reduced excess bandwidth ratio over the original legacy signal. For example, the original legacy signal may have an excess bandwidth ratio of 0.2. Accordingly, the new layered signals will each have an independent bandwidth ratio that does not exceed 0.2. The excess bandwidth ratio for any of the layered signals can be further reduced not to exceed 0.1. In addition, the upper and lower layer signals can be amplified and transmitted from a common satellite and/or antenna or from different satellites and/or antennas.

5.1 Symbol Rate Variation

The first modulation scheme involves reducing the symbol rate of the lower layer signal, e.g., the new lower layer signal 808B operating over the upper layer legacy signal 808A. The symbol rate in a digital signal relates to the signal power concentrated over smaller bandwidth; doubling the symbol rate doubles the throughput and carrier power (requiring that adequate available bandwidth). By reducing the symbol rate below that of the upper layer signal 808A, the lower layer signal 808B occupies a narrower bandwidth. This means that a smaller amount of interference will be exhibited at the legacy signal. Thus, the legacy signal 808A can be operated at a lower power level than would otherwise be required to be received by a legacy receiver 500. However, a reduced symbol rate will also reduce the throughput for the lower layer signal 808B.

In contrast, merely reducing the code rate of the lower layer signal 808B does not reduce signal bandwidth. The spectrum of a digital signal relates to the signal power spread across the signal bandwidth regardless of the code rate. A code rate reduction would reduce the required CNR. In fact, continued reduction of the code rate would eventually drive the carrier-to-noise ratios (CNR) below an acceptable threshold required to ensure carrier lock for signal demodulation In addition, doubling the carrier power only increases Shannon capacity by approximately 1 bps/Hz at high CNR; the required power increases more than linearly with throughput. It is for these reasons that changing the symbol rate can be more attractive than changing the code rate in many cases.

5.2 Guard Band Reduction

A second modulation scheme requires reducing or eliminating the guard band. In the current DIRECTV broadcast satellite frequency plan, a guard band of 5.16 MHz exists between adjacent transponders of the same polarization. This is a legacy configuration from earlier satellite communication standards for analog FM transmission. The FM communication standard requires a relatively high CNR (on the order of 14 dB), and is therefore more susceptible to spectral regrowth effects from satellite TWTA non-linearity and other imperfections. In fact, the designed guard band has provided more than enough margin for the FM signal to reject spread signal energy due to adjacent channel interference (ACI).

In comparison, the current digital Direct Broadcast Systems (DBS) signal requires a CNR on the order of 7.6 dB with prevailing QPSK modulation and concatenated forward error correction (FEC) codes. With the advent of turbo-like codes, such as turbo product codes, serial/parallel concatenated convolutional codes and low-density parity check codes, which provide higher coding gains than the conventional codes, the required CNR drops even lower (to around 5.4 dB for the same modulation and a similar code rate). In the following, turbo-like codes are referred to as advanced FEC codes in contrast with conventional codes. Again, other factors being equal, signals with smaller CNRs are less susceptible to noise and interference effects. For example, a computer simulation on out-of-band (OOB) signal power ratios of a typical TWTA nonlinearity yields an OOB ratio of approximately −20 dB at ±12 MHz with an α of 0.2, and an OOB ratio of approximately −20 dB at ±11 MHz with an α of 0.1. Both these simulations assume linearized TWTAs and are conservative, based upon a "brick wall" filter for the undesired signal.

Figure 14A:
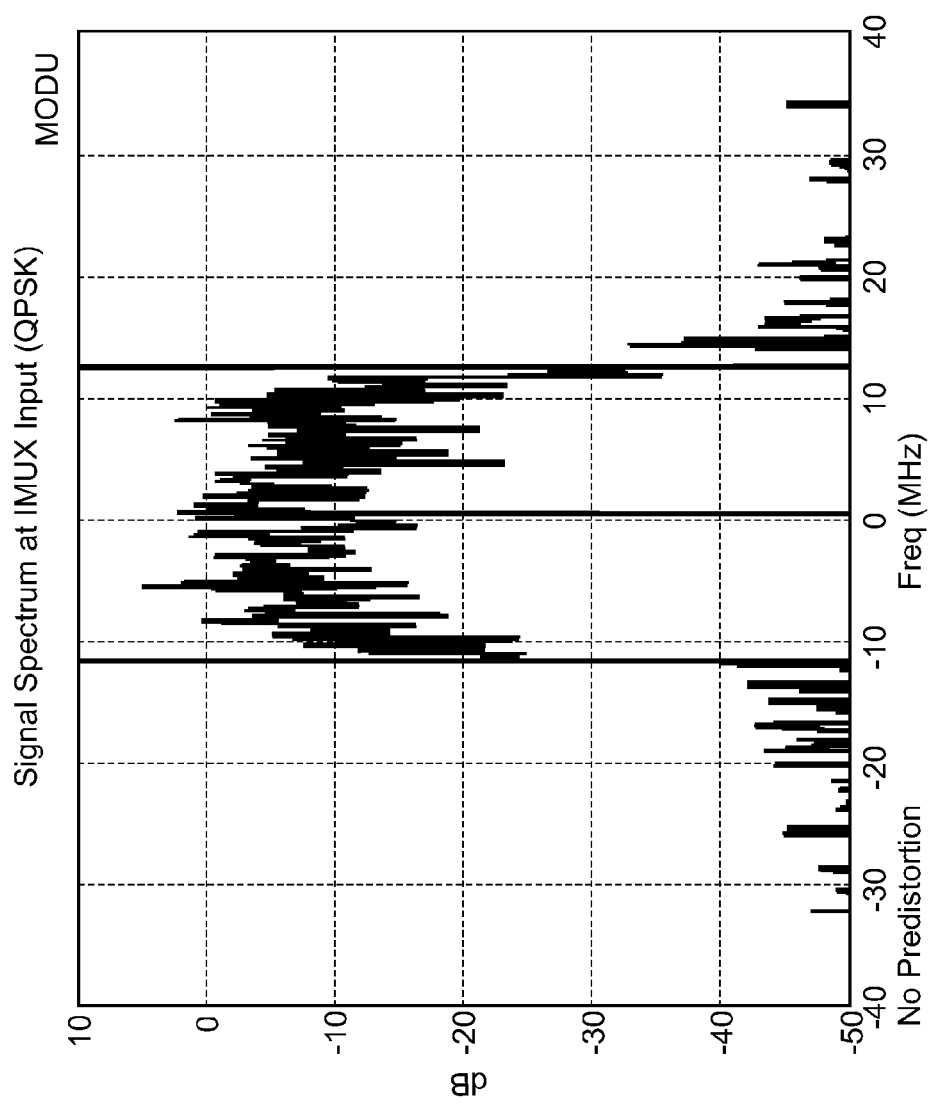
FIGS. 14A-14E illustrate the guard band as used in a layered modulation application.
Figure 14B:
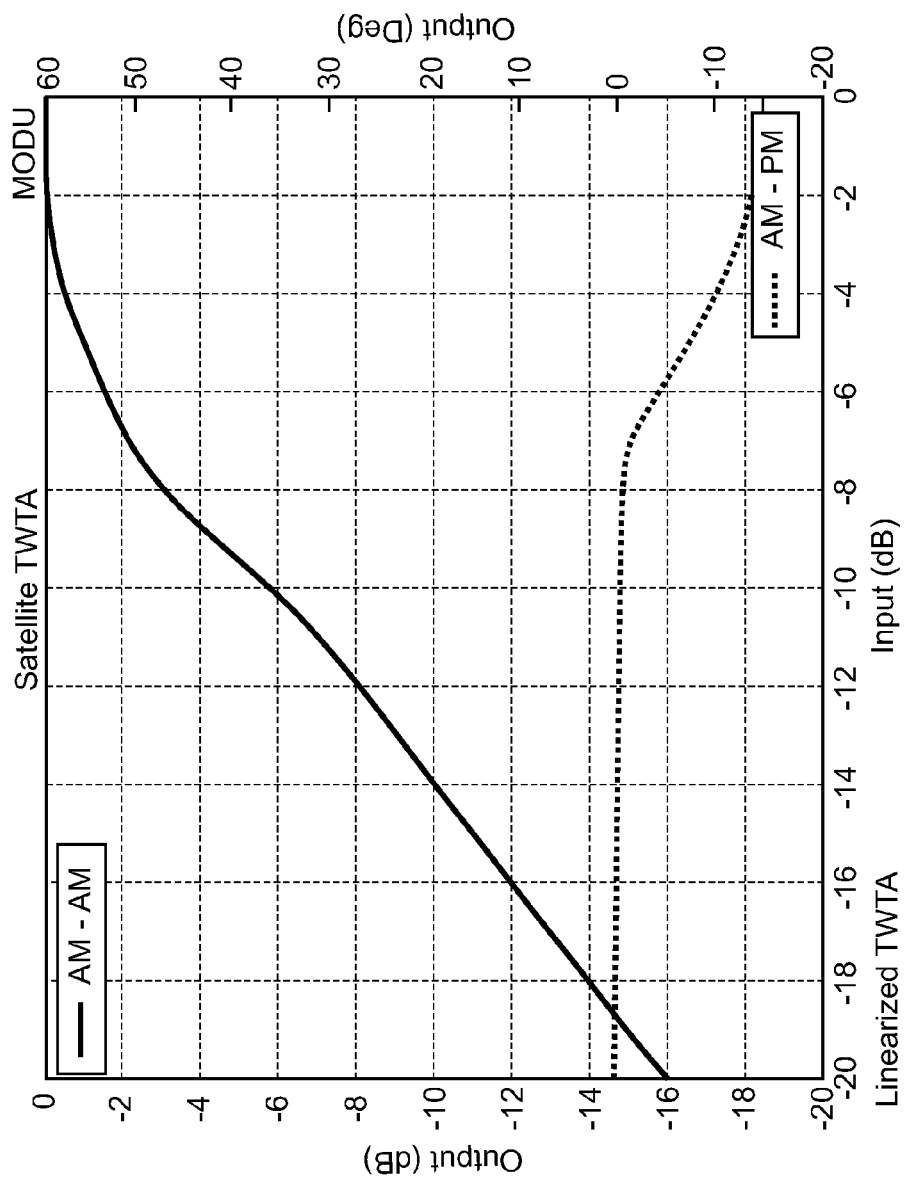
Figure 14C:
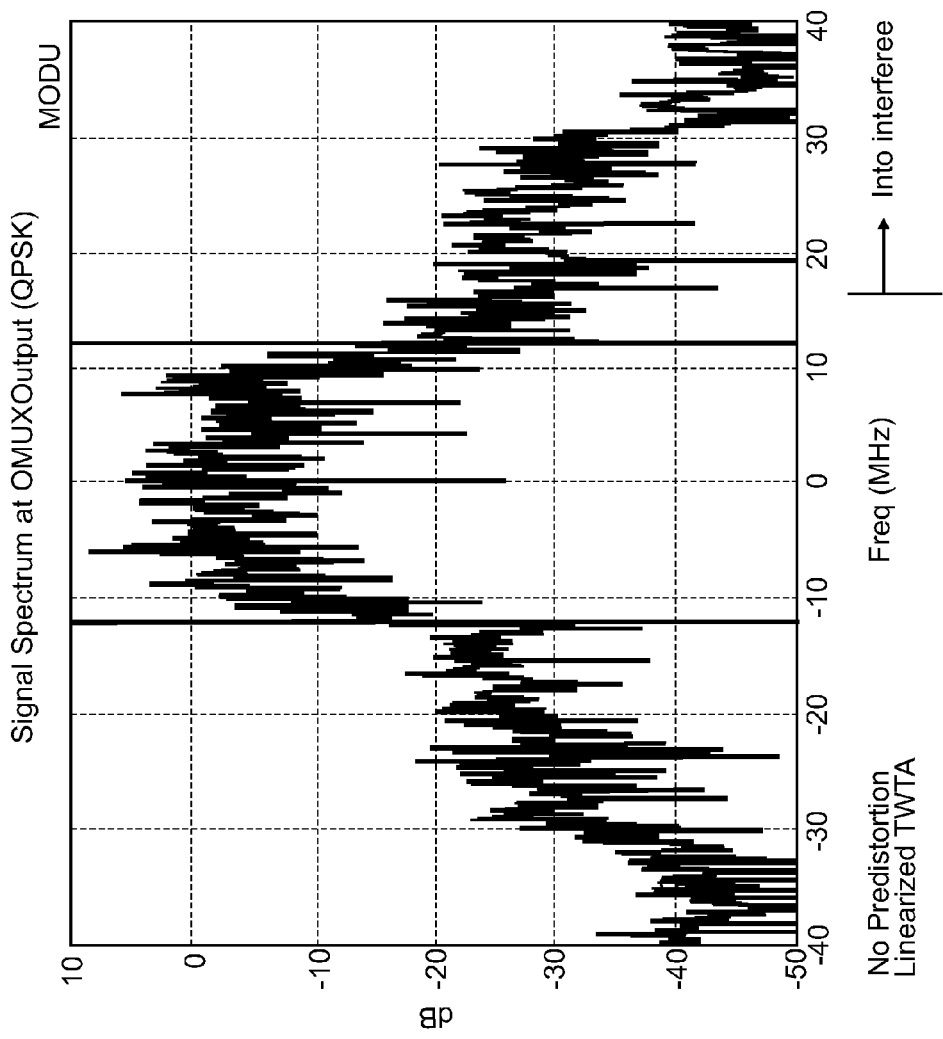
Figure 14D:
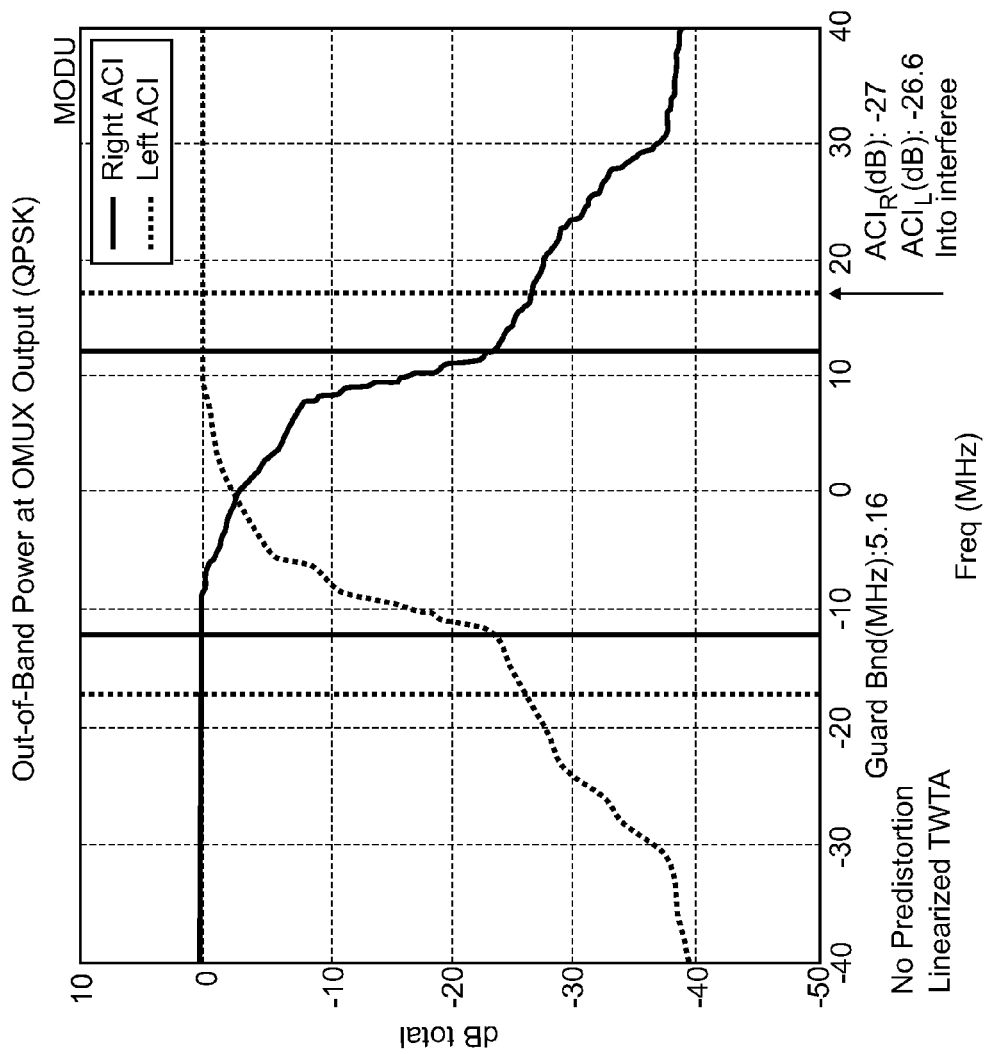
Figure 14E:
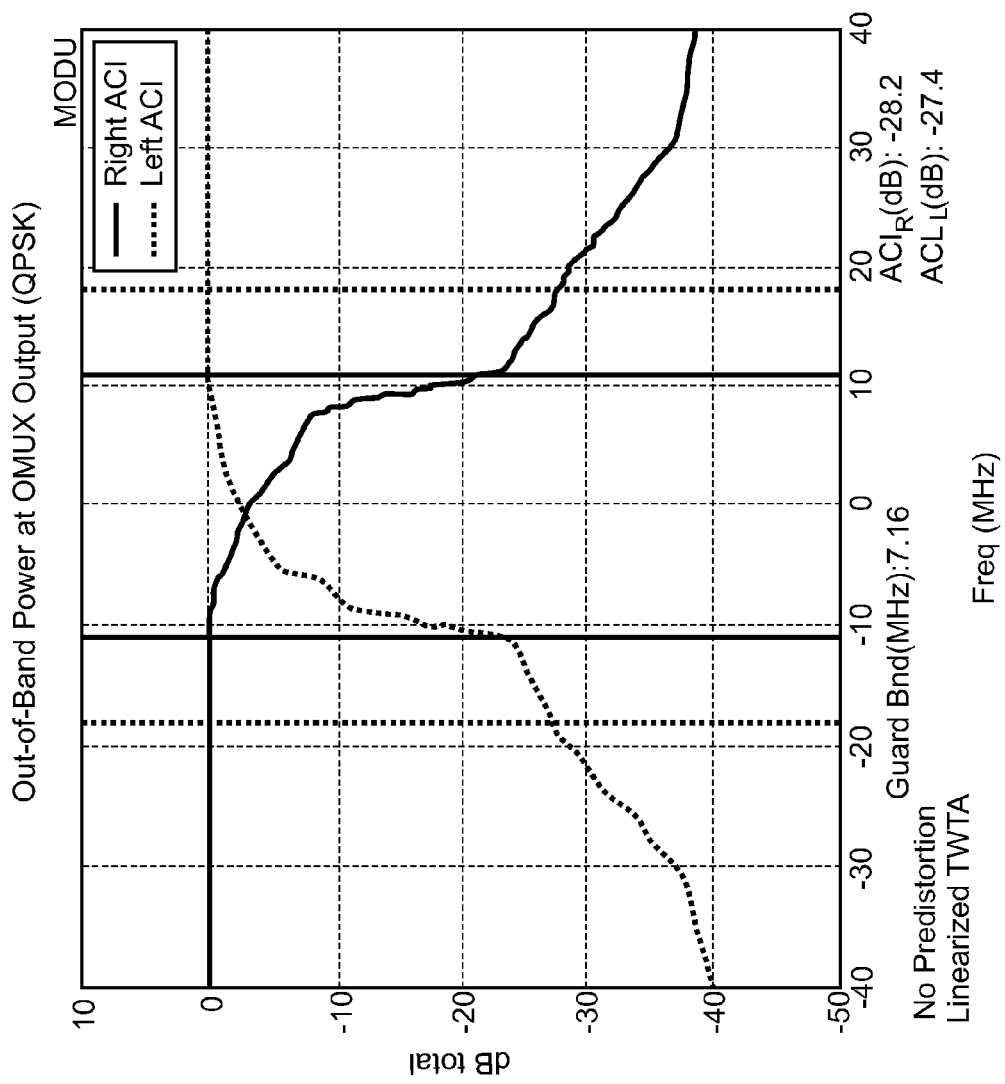

FIGS. 14A-14E illustrate spectral outgrowth effects into the guard band. FIG. 14A is an exemplary computer simulated signal spectrum without TWTA nonlinearity and with an α of 0.2. FIG. 14B illustrates the amplitude and phase characteristics of an exemplary "linearized" satellite TWTA. FIG. 14C illustrates exemplary signal spectrum after processing through an output multiplexer (OMUX) on a satellite with a of 0.1. Thus, the signal has been processed through an input multiplexer (IMUX), the linearized TWTA and the OMUX. FIG. 14D illustrates the out-of-band signal power ratio versus the cutoff frequency with an α of 0.2. Spectral re-growth is mostly due to TWTA non-linearity. With a 5.16 MHz guard band, the OOB ratio is approximately −23 dB at the maximum frequency $f_{max}$ at ±17.2 MHz. Without the guard band, the OOB ratio is approximately −20 dB at the $f_{max}$ of ±12 MHz. FIG. 14E illustrates the out-of-band signal power ratio versus the cutoff frequency with an α of 0.1. Here, with the guard band, $f_{max}$ is ±18.2 MHz and the OOB ratio is approximately −24 dB. Without the guard band, $f_{max}$ is ±11 MHz and the OOB ratio is approximately −20 dB (little changed from the α=0.2 case).

Accordingly, the existing guard band for DIRECTV (and other DBS systems) may be reduced or even eliminated with only a small impact on communication performance. For example, eliminating the DIRECTV guard band could increase spectral efficiency by a factor of approximately 22% (from the ratio of 29.16/24). The throughput increase is achieved by increasing the symbol rate with this ratio without the need to increase the code rate which would require more power.

5.3 Excess Signal Bandwidth Ratio Reduction

Excess bandwidth reduces inter-symbol interference (ISI) that comes from symbol timing recovery and other errors from the demodulator. ISI is a form of "self-interference;" degradation on CNR increases with the CNR value. An excess bandwidth ratio of 0.2 is used in current DIRECTV systems. For similar reasons discussed above as applied to guard band reduction, degradation from ISI on CNR is not as severe for lower CNRs. Analysis and simulation show that the α for digital satellite communication may go as low as 0.1 without significant performance degradation. For reference, the advanced television systems committee (ATSC) terrestrial digital TV standards need a much higher CNR (thus more susceptible to ISI effects), yet the standard only stipulates an excess bandwidth ratio of about 0.1.

Reducing the excess bandwidth ratio from 0.2 to 0.1 for DIRECTV easily increases spectral efficiency by as much as 9% (from the ratio of 1.2/1.1). Consistent with the guard band reduction scheme, throughput increase from a reduced excess bandwidth ratio is achieved by increasing the symbol rate with the above ratio. The combined throughput increase from a guard band reduction and an excess bandwidth ratio reduction is approximately 32%. Although a lower CNR from using an advanced FEC code will result in greater timing recovery errors, computer simulations show that current excess bandwidth provides an adequate margin. A slightly increased impact on CNR is observed with a pessimistic root mean square (RMS) timing error of approximately 0.075 times the symbol interval (TWTA non-linearity not included). Thus, an excess bandwidth ratio of 0.1 reduces the signal CNR by approximately 0.151 dB. In comparison, an excess bandwidth ratio of 0.2 reduces the signal CNR by approximately 0.148 dB, and an excess bandwidth ratio of 0.35 reduces the signal CNR by approximately 0.136 dB. TWTA non-linearity flattens the signal waveform and therefore increases tracked timing errors. This can be compensated by imposing slightly higher linearity requirements on new TWTAs. The smaller lower layer signal power required allows the TWTA to operate closer to its linear region.

Figure 15A:
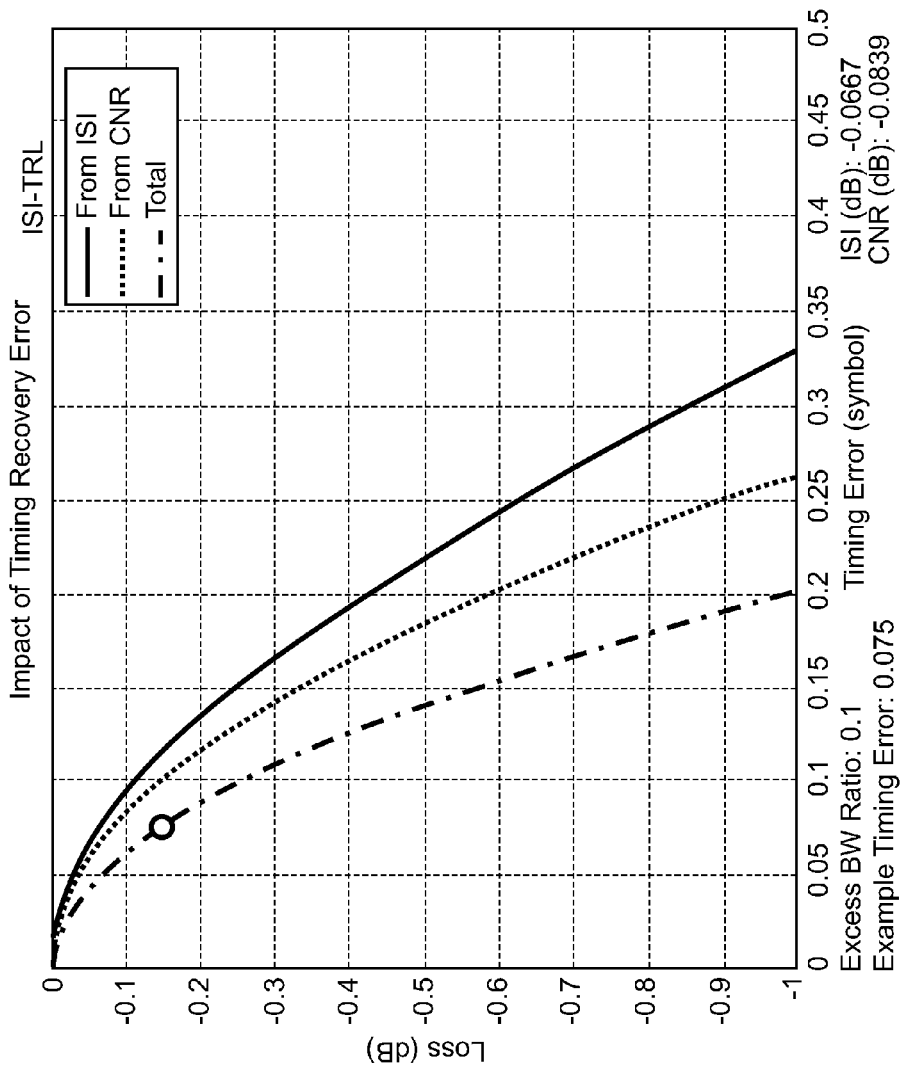
FIGS. 15A and 15B illustrate the impact of excess bandwidth ration on symbol timing error.
Figure 15B:
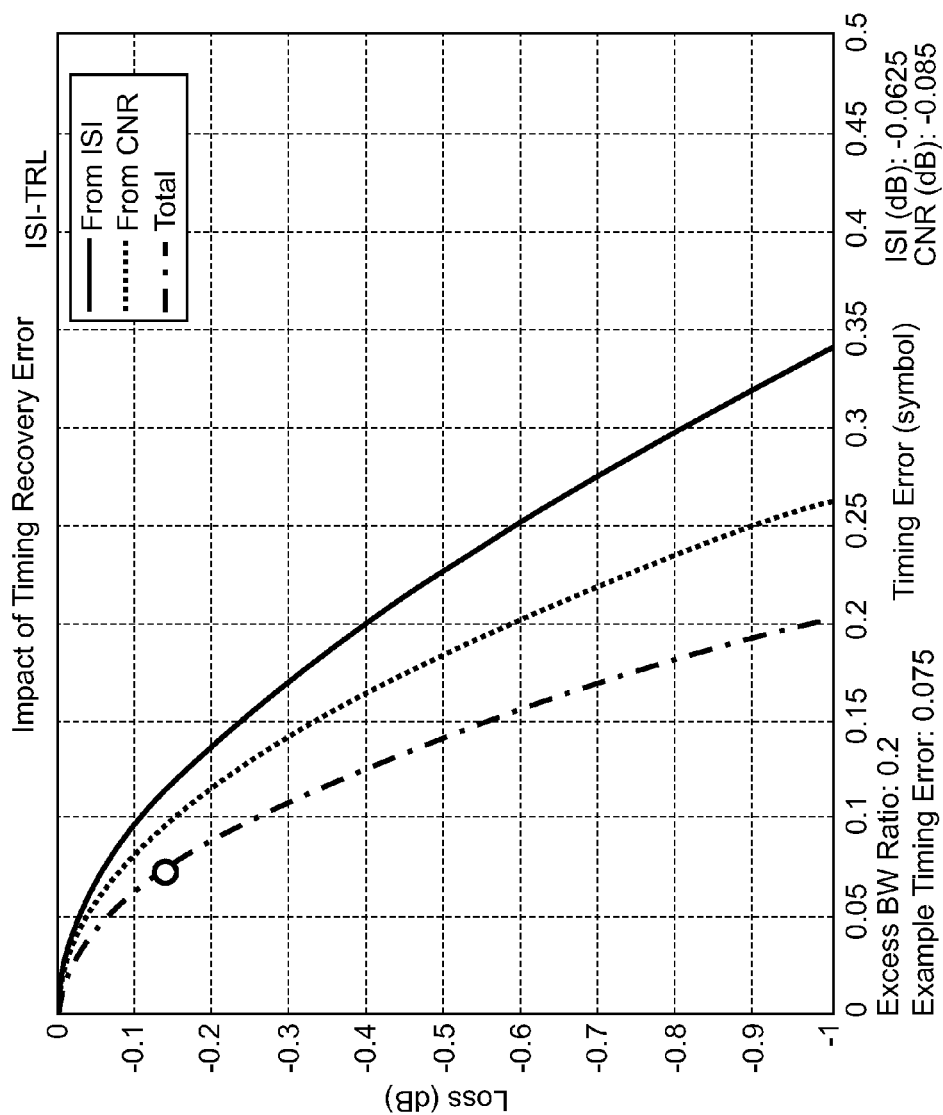

FIGS. 15A and 15B illustrate the impact of excess bandwidth ratio on symbol timing error by computer simulations. FIG. 15A illustrates the symbol timing error with an excess bandwidth ratio of 0.1 for a root raised cosine filter. The ISI is calculated by sampling from adjacent symbols off zero-crossing points. The CNR reduction is calculated by sampling the signal off-peak. FIG. 15B illustrates the symbol timing error with an excess bandwidth ratio of 0.2. The results are very similar to that of FIG. 15A.

5.4 Layered Modulation in the Guard Band

If two new layered signals are added substantially in the guard band of the legacy upper layer signal, spectral efficiency can be doubled with a small increase in the noise floor from that of the legacy signal. This means it is possible to add additional throughput with backward compatibility and with a small increase in legacy signal power. There will be some mutual impact between signals in guard and legacy bands due to spectral re-growth, particularly when the guard band and/or the excess bandwidth ratio are reduced from their original values as suggested by this invention. The worst case scenario with respect to impact is to the new lower layer signal in the guard band from the legacy signal (e.g. desensitization of approximately 0.9 dB), a consequence of the significantly higher power of the legacy signal. One solution to mitigate this effect is to increase the power levels of the layered signals to overcome the degradation from legacy signal. The impact on the legacy signal from the new lower layer signal is less severe (e.g. receiver desensitization of approximately 0.2 dB). Both new signal layers can include an advanced FEC code. In addition, implementation of this modulation scheme will provide the infrastructure that can later be used to convert the system to a non-backwards compatible modulation scheme with maximized spectral efficiency.

5.5 Exemplary Applications of Modulation Schemes

When the modulation schemes described in sections 5.1 through 5.4 are combined, spectral efficiency of the legacy system can be increased by as much as 50% while remaining backwards compatible with the legacy system. When the above modulation schemes are selectively applied to non-BWC applications, better power and spectral efficiencies also follow. As an example, use of layered modulation can increase spectral efficiency by as much as 184% with only approximately 4.3 dB of increase relative to legacy signal power. In comparison, the 8-PSK system (with an advanced FEC code) would only achieve approximately 72% increase in spectral efficiency, while requiring a 1.2 dB power increase.

Figure 16A:
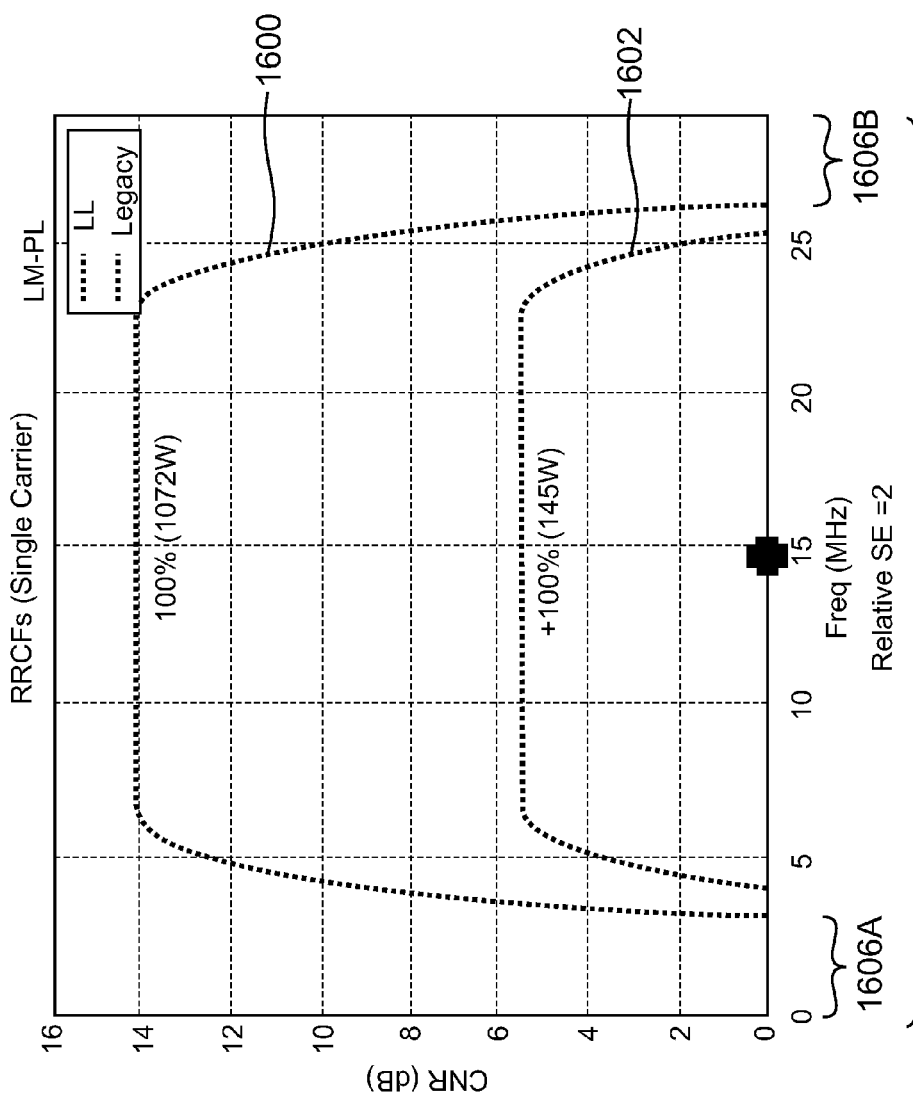
FIGS. 16A-16H illustrate some exemplary layered modulation schemes.

FIGS. 16A-16H illustrate some exemplary layered modulation implementations. FIG. 16A illustrates a basic layered modulation implementation using a single carrier frequency for both layers with an excess bandwidth ratio of 0.2 for both the upper and lower layer signals. The code rate is 6/7 for both signals and spectral efficiency is 200% relative to the a legacy signal. Both the upper layer signal 1600 and the lower layer signal 1602 occupy the same frequency band 1604. In this case, a guard band 1606A, 1606B is indicated by the absence of signal on both sides of the frequency band 1604.

Figure 16B:
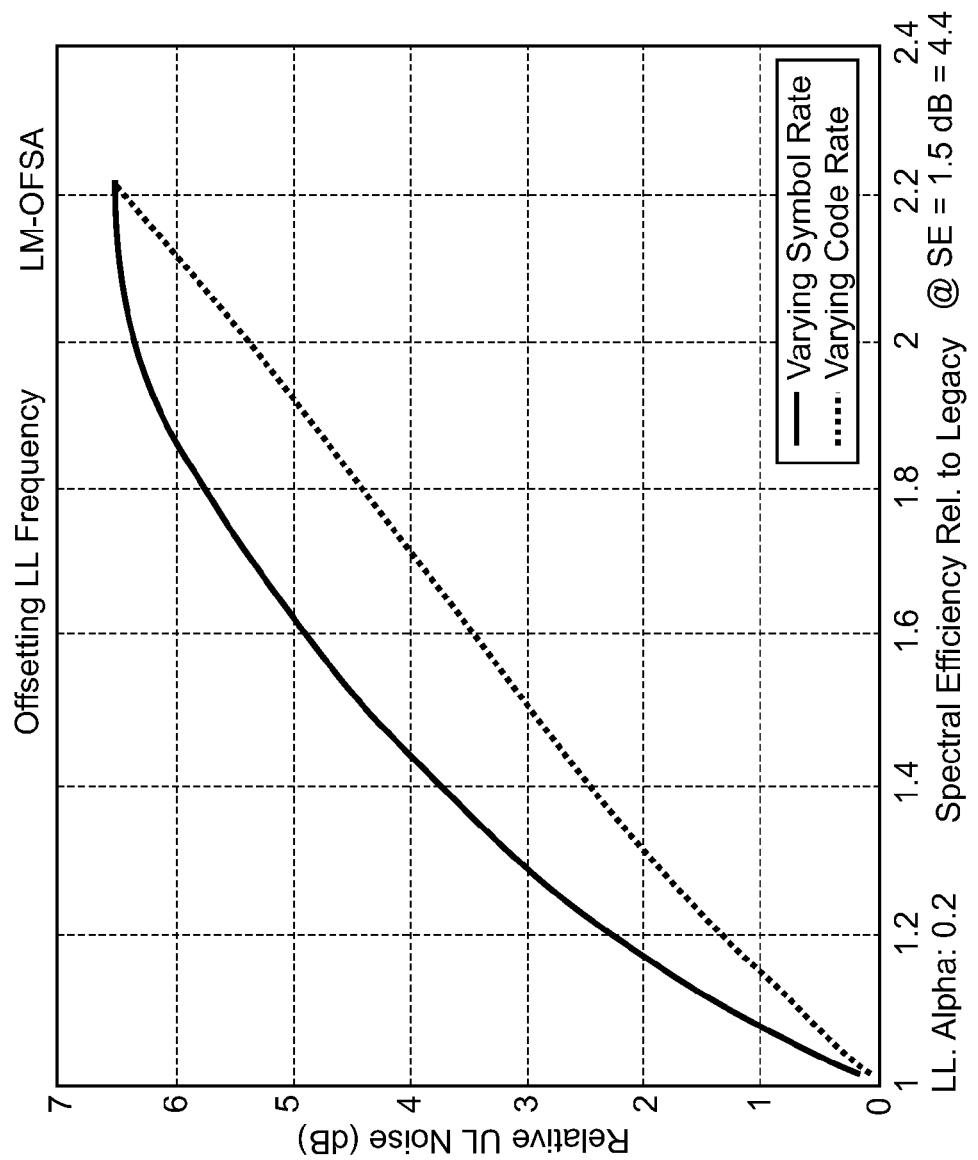

FIG. 16B illustrates spectral efficiency of modulation schemes of the present invention compared with the basic layered modulation implementation. The horizontal axis is spectral efficiency relative to that of the legacy signal, and the vertical axis is the effective noise floor as seen by the upper layer signal (the lower the noise floor, the less power the upper layer signal requires). In this case, the carrier lock requirement is ignored. Both the upper and lower layer signals have an excess bandwidth ratio of 0.2. Spectral efficiency improves to a maximum of 222% of the legacy throughput as the lower layer signal includes the guard band when compared with the basic layered modulation implementation. The plot shows a curve for varying the symbol rate as well as varying the code rate. Varying the code rate is shown to be more power efficient than varying the symbol rate for the upper layer signal.

Figure 16C:
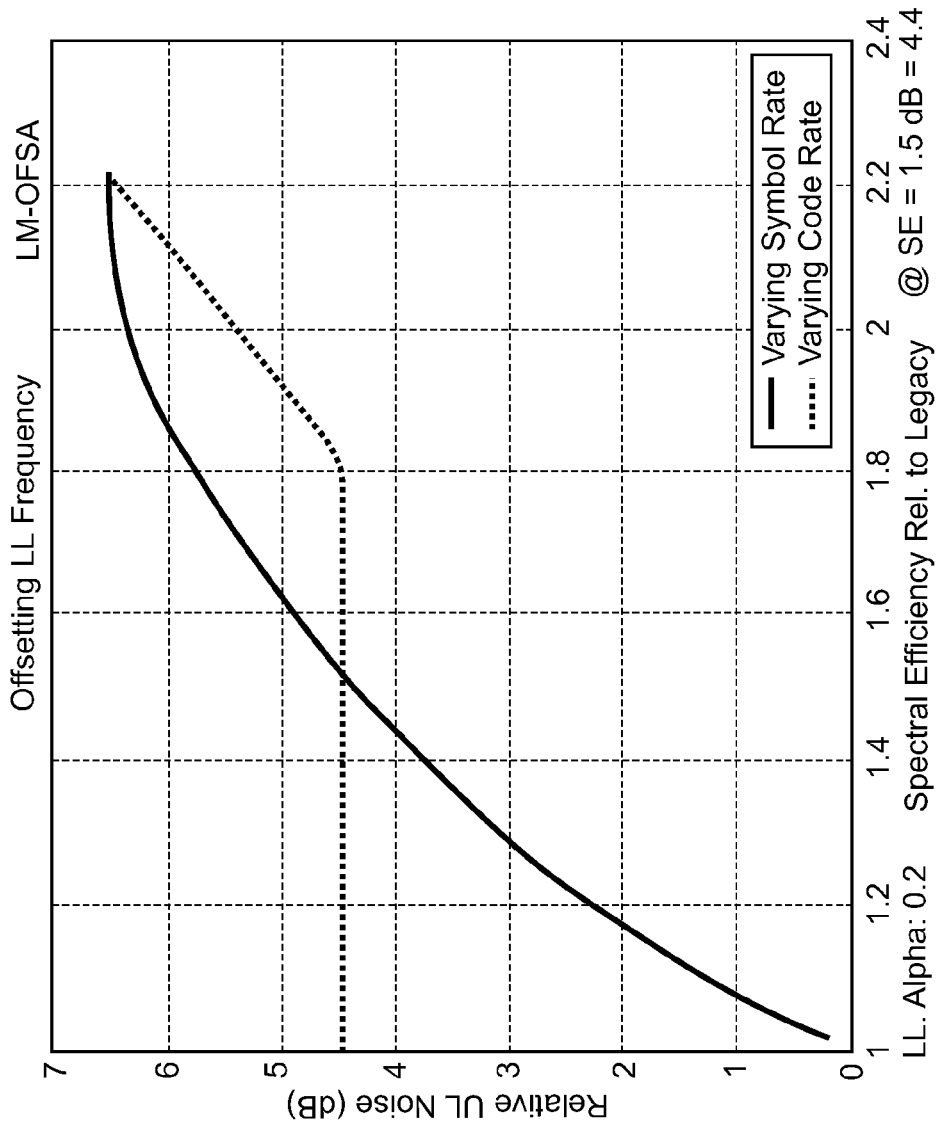

FIG. 16C illustrates spectral efficiency of modulation schemes of the present invention compared with the basic layered modulation implementation, but with the carrier lock requirement considered. Here, also, both the upper and lower layer signals have an excess bandwidth ratio of 0.2. Again, spectral efficiency improves to a maximum of 222% as the lower layer signal includes the guard band when compared with the basic layered modulation implementation. The upper layer carrier signal operates at approximately 1080 W with a symbol rate of 20 MHz. The lower layer carrier signal operates at approximately 176 W with a symbol rate of 24.3 MHz. Similar to FIG. 16B, the plot shows a curve for varying the symbol rate as well as varying the code rate. Varying the code rate is more power efficient than varying the symbol rate down to approximately 50%, when the carrier becomes a problem. The maximum upper layer power increase is approximately 6.5 dB.

Because reducing the code rate and symbol rate results in the least spectral efficiencies, a layered modulation implementation can begin with both the code rate and symbol rate maximized. In this case, a CNR of at least 6.5 dB should be used for the upper layer signal. Next, spectral efficiency can be reduced to a desired or affordable level in terms of power requirements. As the symbol rate is reduced, the total noise introduced by the lower layer decreases linearly. The lower layer signal frequency should be positioned to minimize spectral overlap with the upper layer signal frequency. As the code rate is reduced, the total noise introduced by the lower layer signal decreases at a greater than linear rate. Also, reducing the code rate is limited by the required CNR floor for the carrier lock of the lower layer signal, e.g., approximately 1.2 dB for QPSK without pilots. Crossover in spectral efficiency generally exists between the methods of reducing the code rate and reducing the symbol rate. Accordingly, the code rate can be selected above crossover spectral efficiency and the symbol rate selected below crossover spectral efficiency.

Figure 16D:
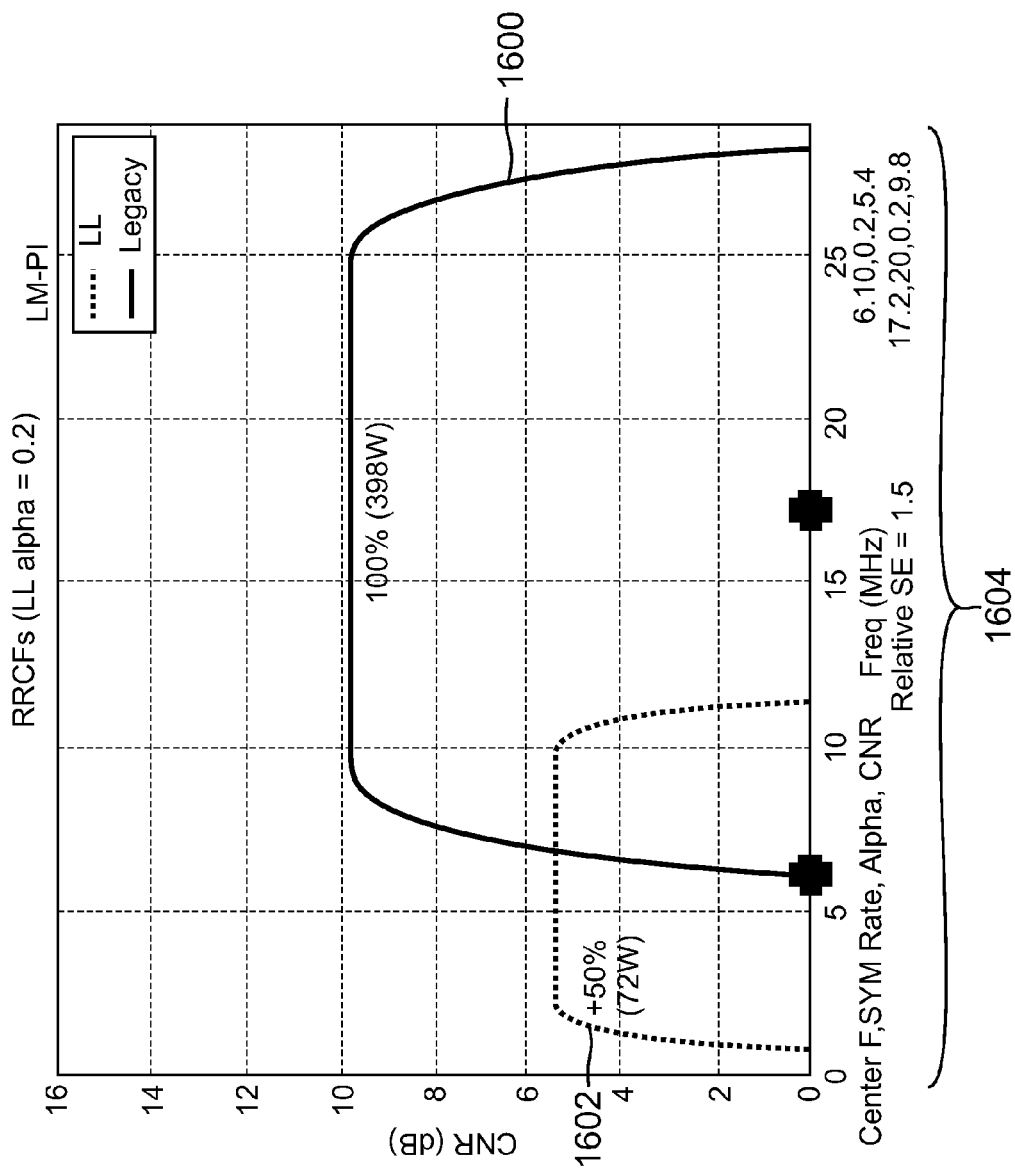

FIG. 16D illustrates an exemplary layered modulation signal scheme where the lower layer signal is disposed in the guard band of the upper layer signal. The lower layer signal begins at the edge of the frequency band to minimize interference into the upper layer signal. In this example, the lower layer signal (guard band signal) has an excess bandwidth ratio of 0.2 and a power level of approximately 72 W. The upper layer signal (legacy signal) has an excess bandwidth ratio of 0.2 and a power level of 398 W. The code rate is 6/7 for the legacy upper layer signal and the new-service lower layer signal. This example yields a spectral efficiency of approximately 150% compared with a legacy signal. As is shown, substantially no guard band is used within the frequency band 1604.

Figure 16E:
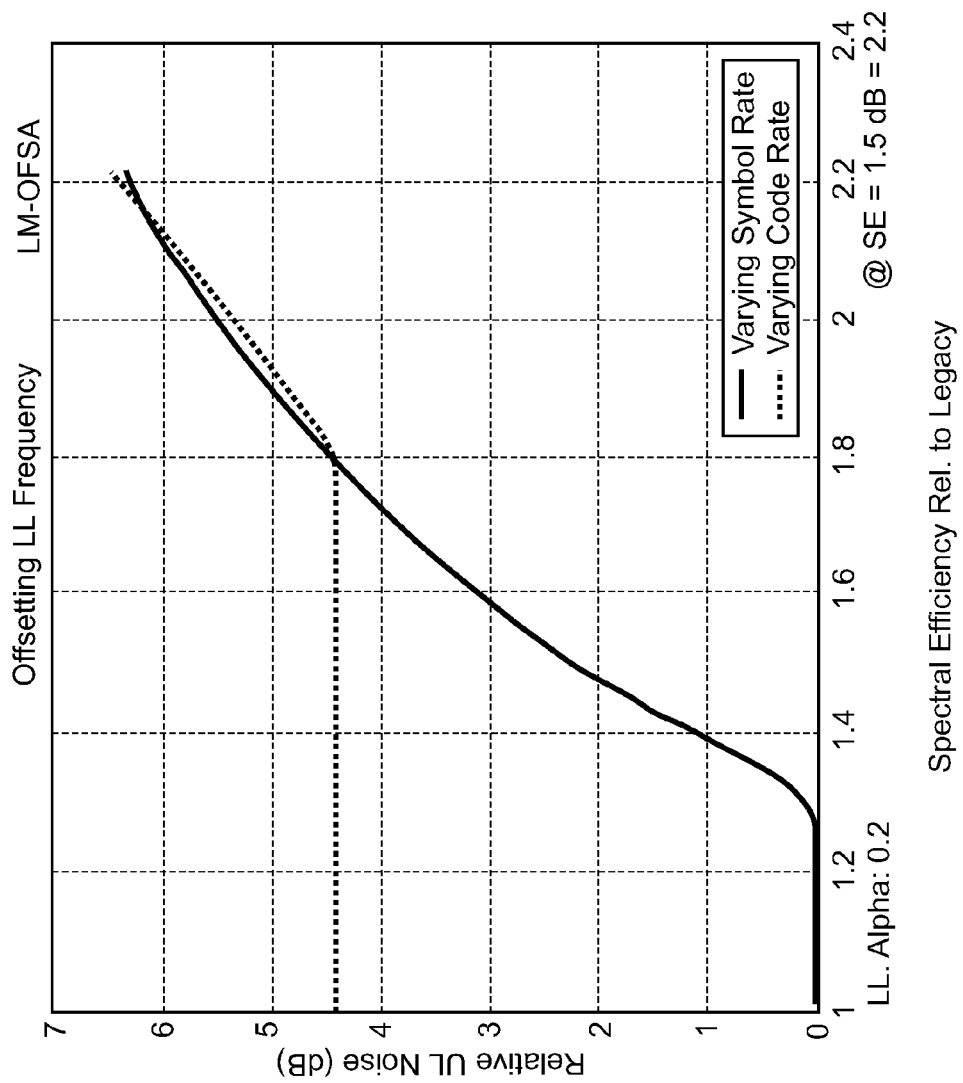

FIG. 16E illustrates spectral efficiency of the exemplary layered modulation signal scheme of FIG. 16D. No interference is shown with the lower layer signal bandwidth up to 5.2 MHz. The code rate is fixed at 6/7 for the lower layer signal. Spectral efficiency improves to about 150% over a legacy signal with a +2.2 dB over the legacy signal power. However, spectral efficiency of 222% is obtained with a +6.5 dB power level over the legacy signal power. Spectral re-growth is ignored here. Note that varying the symbol rate is more power efficient than varying the code rate up to a 180% spectral efficiency factor. The maximum power increase of the upper layer signal is approximately 6.5 dB.

Figure 16F:
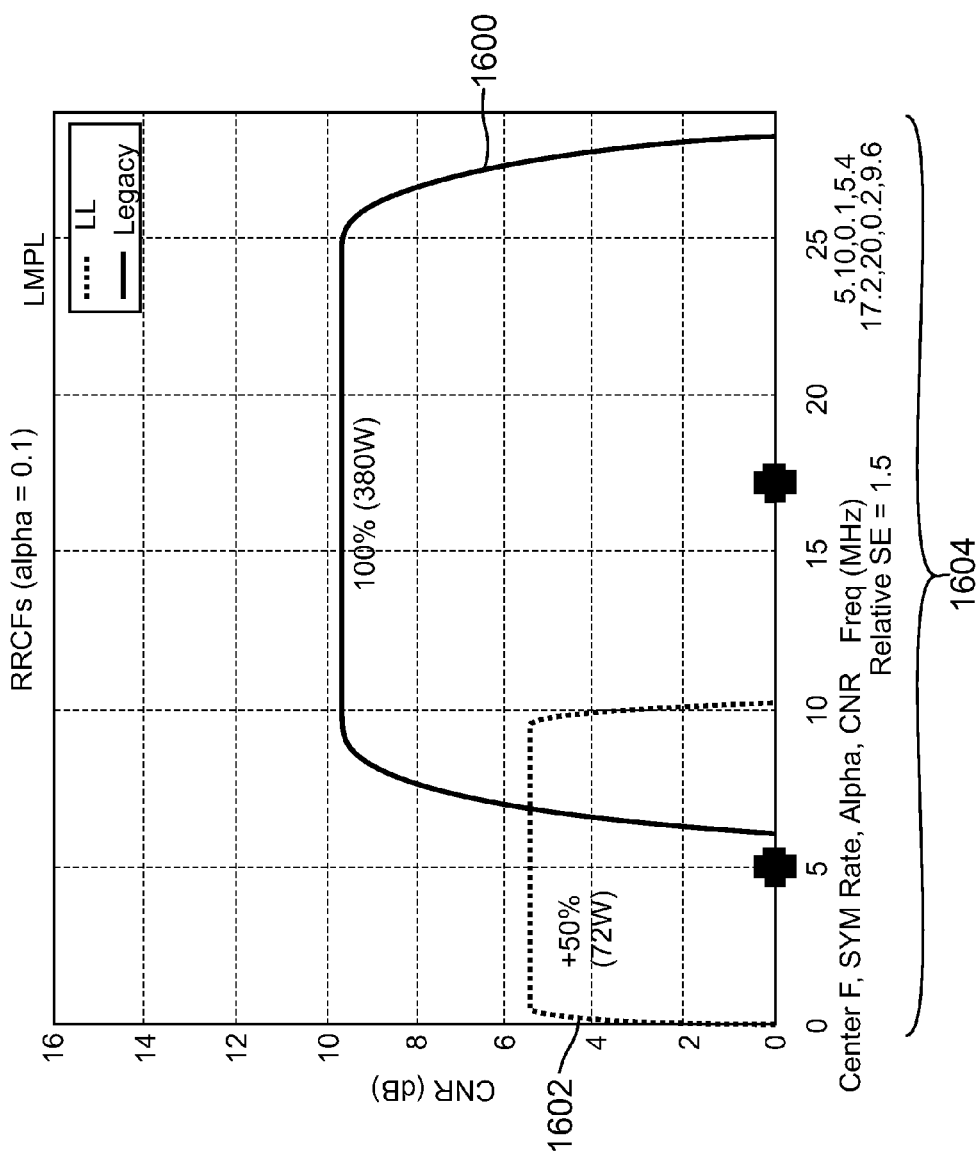

FIG. 16F illustrates another exemplary layered modulation signal scheme where the lower layer signal is disposed in the guard band of the upper layer signal. In this case the lower layer signal has an excess bandwidth ratio of 0.1 and a power level of approximately 72 W. Here also the lower layer signal begins at the edge of the frequency band to minimize interference into the upper layer signal. The upper layer signal (legacy signal) has an excess bandwidth ratio of 0.2 and a power level of 380 W. The code rate is 6/7. Again, as shown, substantially no guard band is used within the frequency band 1604.

Figure 16G:
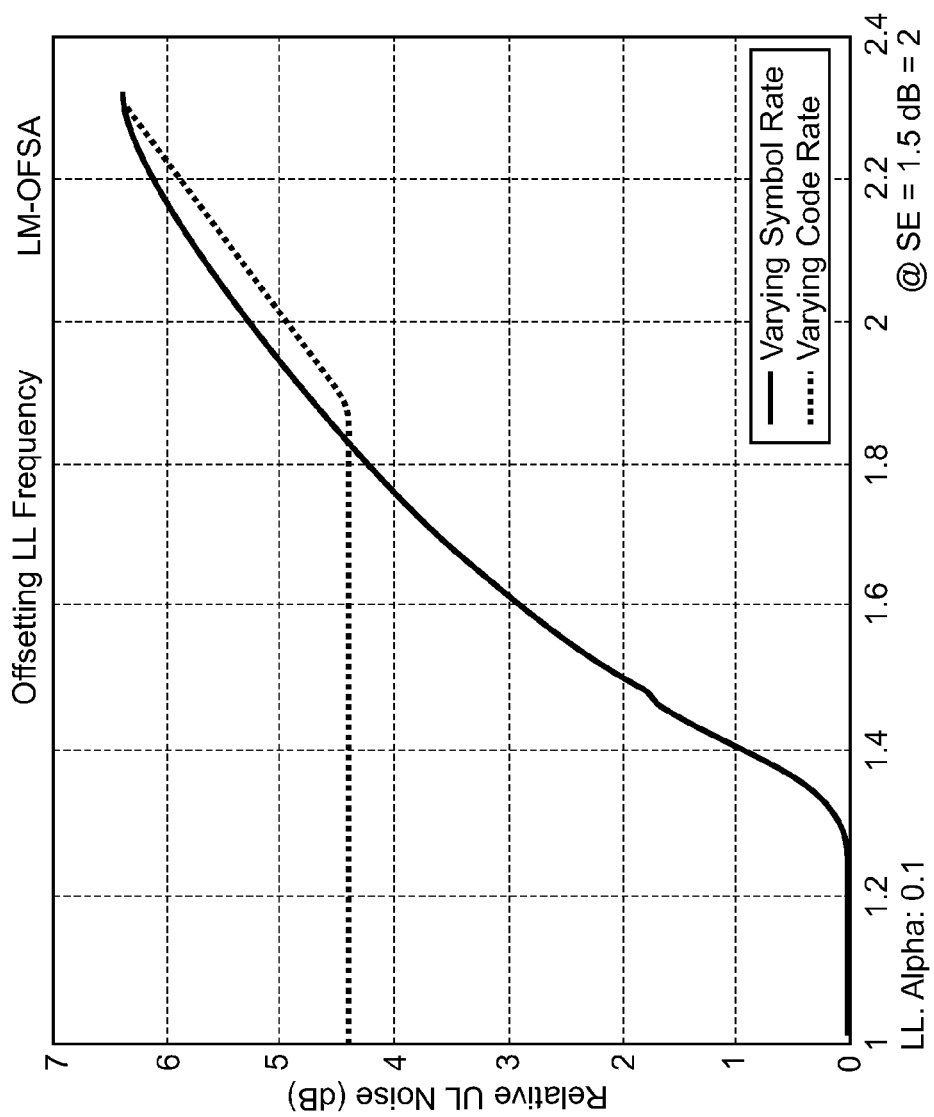

FIG. 16G illustrates spectral efficiency of the exemplary layered modulation signal scheme of FIG. 16F. Less interference into the upper layer signal by the lower layer signal is shown, as compared with FIG. 16E. In this example, spectral efficiency improves about 150% with a +2.0 dB over the legacy signal power. Spectral efficiency of 232% is obtained with a +6.5 dB power level over the legacy signal power. The increase in spectral efficiency is because a higher symbol rate is available than with the previous example (although the lower layer signal requires approximately +0.4 dB). Spectral re-growth is again ignored here. Note that varying the symbol rate is more power efficient than varying the code rate for up to a 185% spectral efficiency. The maximum power increase of the upper layer signal is approximately 6.5 dB.

Figure 16H:
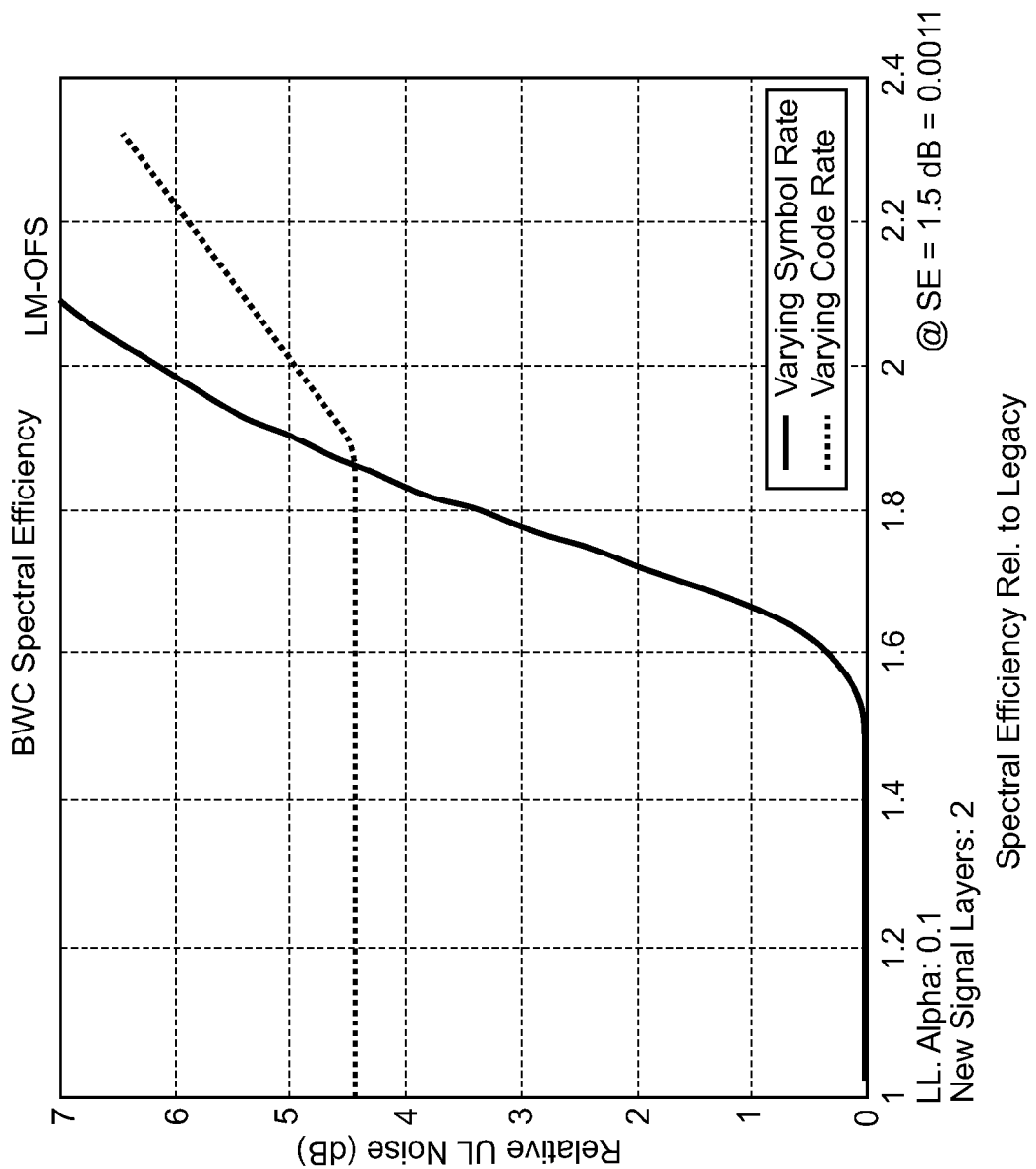

FIG. 16H illustrates spectral efficiency of the exemplary layered modulation signal scheme where a two-layered signal is applied in the guard band. Here a steep curve is exhibited with varying symbol rate. The signal scheme is most efficient at lower symbol rates and there is little spectral overlap with the legacy signal. Spectral efficiency is about 150% with no power increase required over the legacy signal power. Spectral efficiency of 172% is obtained with only a +2 dB power level over the legacy signal power.

From the foregoing, it is seen that power can be optimized in a layered modulation system by varying the symbol and/or code rate for backwards compatible applications. The appropriate change in the symbol and/or code rates depends upon the designed spectral efficiency improvement and whether the new signal is backwards compatible. Lower spectral efficiency improvement (e.g. up to +80%) should employ two-layer modulation of the lower layer signal (e.g. in the guard band). Moderate spectral efficiency improvement should employ a single lower layer signal with a varied symbol rate. High spectral efficiency improvement should employ a single lower layer signal with a varied code rate.

Figure 17A:
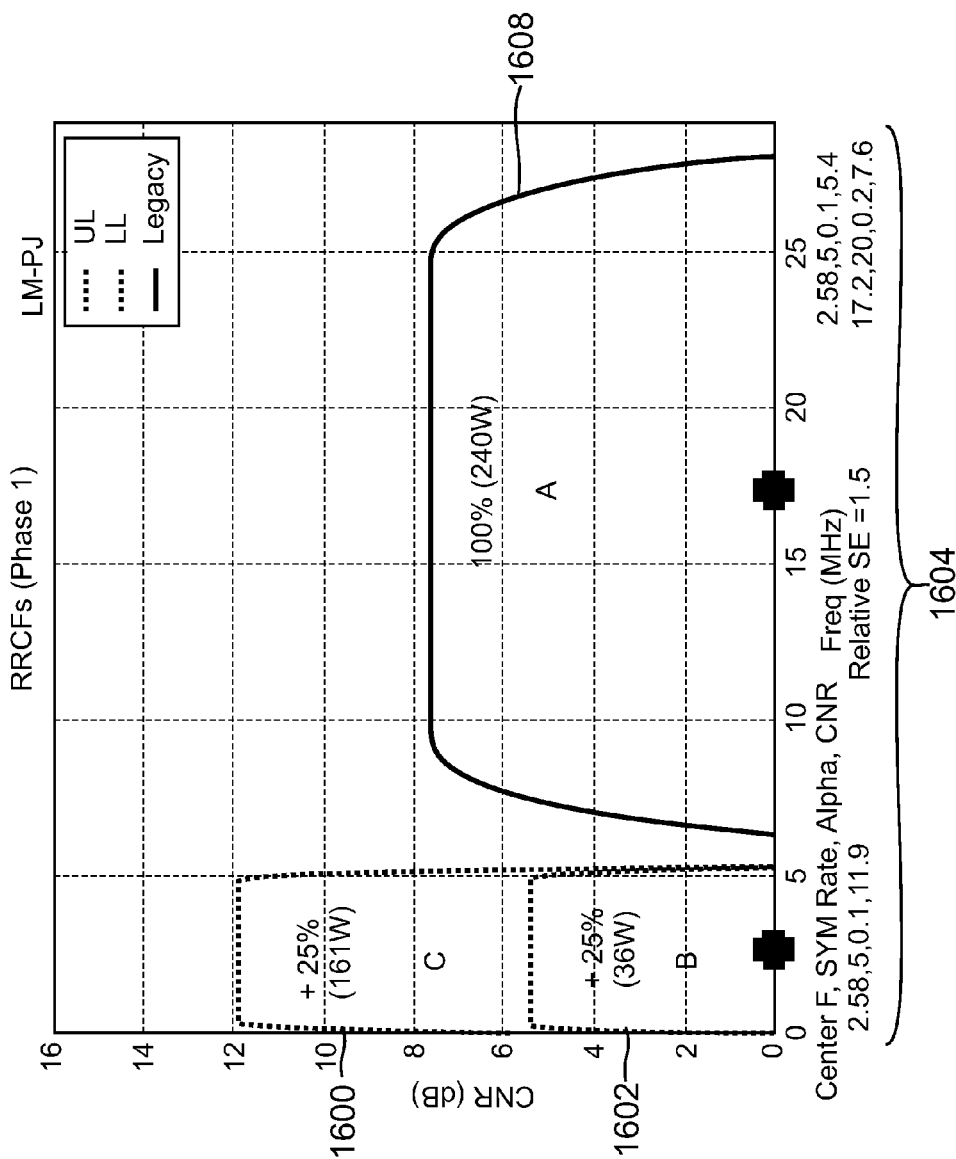
FIGS. 17A-17C illustrate a three-phased implementation plan for upgrading an existing satellite television system.
Figure 17B:
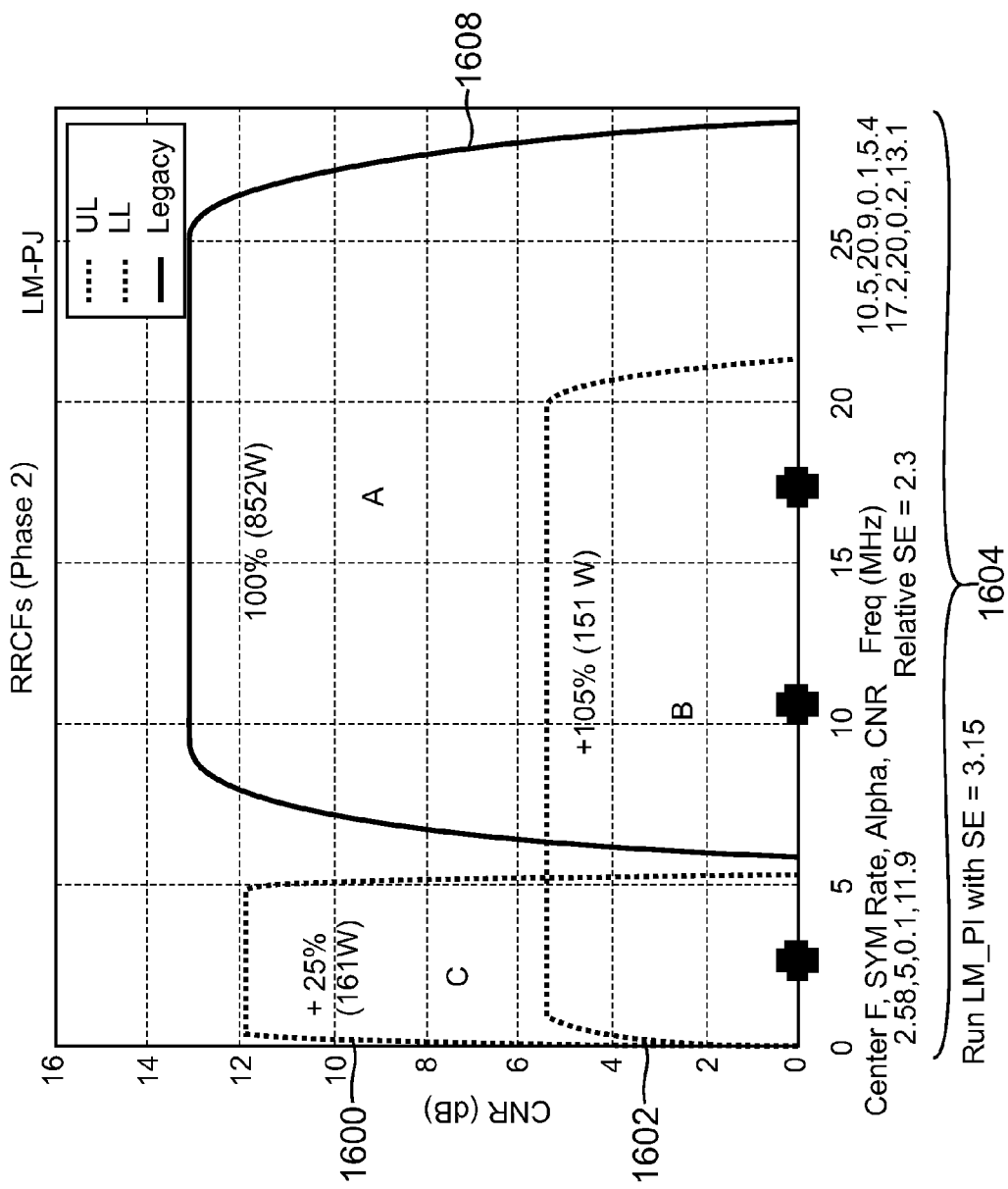
Figure 17C:
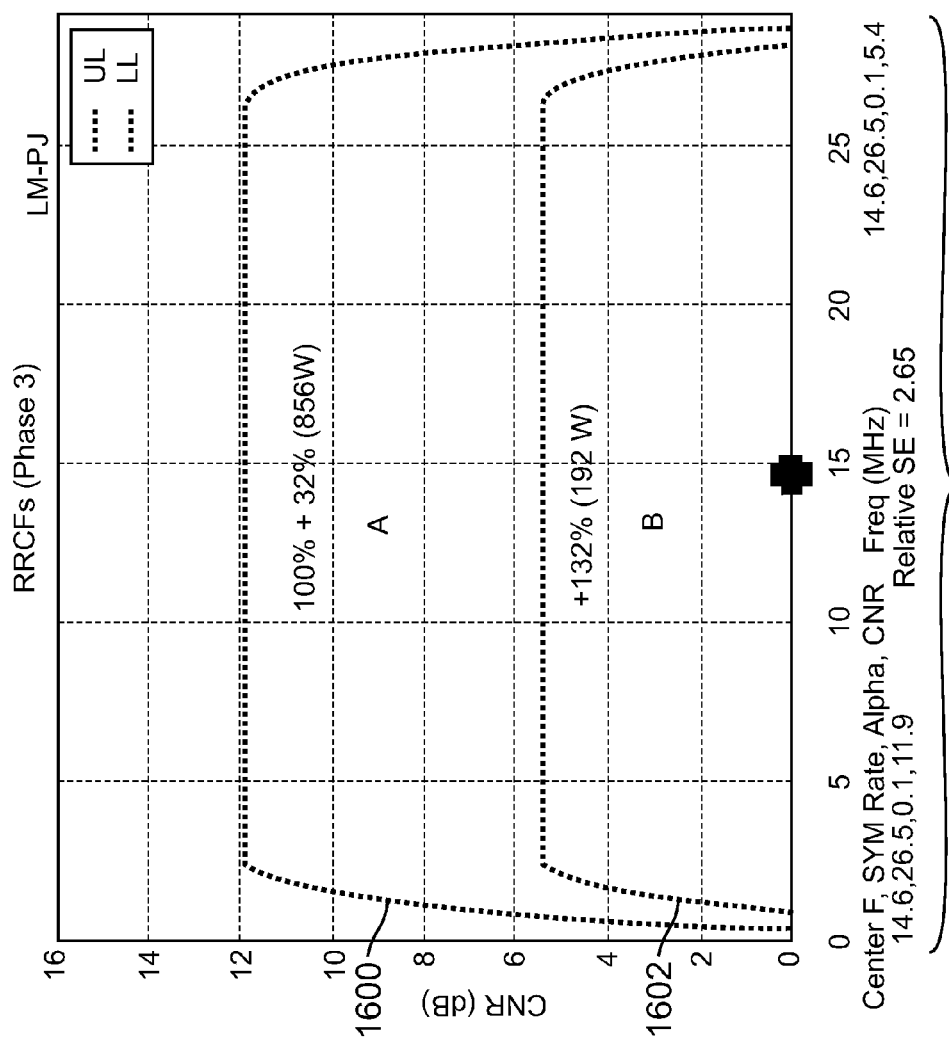

FIGS. 17A-17C illustrate an exemplary three-phased implementation plan for upgrading an existing satellite television broadcast system. FIG. 17A illustrates a first phase where a two-layered signal is added to the guard band. Three transponders are required, one for the legacy signal and two new transponders for each layer of the guard band signal. The layered guard band signals each may have an excess bandwidth ratio of 0.1, while the legacy signal retains an excess bandwidth ratio of 0.2. The CNR for the upper and lower layer signals of the guard band are 11.9 dB and 5.4 dB respectively. The legacy signal employs a CNR of 7.6 dB. Accordingly, the transponder for the legacy signal need not be upgraded to implement the first phase although the layered signals may be operated from an interim satellite. Spectral efficiency improves to 150% of the legacy. In this case, the upper layer signal 1600 and the lower layer signal 1602 share the frequency band 1604 with a third signal 1608, the legacy signal, which occupies a majority of the frequency band. In this phase, the upper layer signal 1600 and the lower layer signal 1602 are distinct from the third signal, i.e., the layered signals do not interfere with the third signal 1608. Effectively, the upper layer signal and the lower layer signal are employed within the guard band of the old legacy signal. Thus, in the new signal, substantially all guard band is used within the frequency band 1604.

FIG. 17B illustrates a second phase where two upper layer signals are spanned by one lower layer signal. One of the upper layer signals is the legacy signal which must have a raised power level to overcome the "noise" of the lower layer signal. Accordingly, the transponder for the legacy signal will need to be upgraded, e.g., migrated to a new satellite. In addition, the lower layer signal may also be migrated to another transponder, e.g., on the same new satellite. The CNR for the upper and lower layer signals of the guard band are 11.9 dB and 5.4 dB respectively, while the legacy signal employs a CNR of 13.1 dB. At this phase spectral efficiency increases to 230%. As with the first phase, the upper layer signal 1600 and the lower layer signal 1602 share the frequency band 1604 with a third signal 1608, the legacy signal, which dominates the frequency band. Here, the lower layer signal 1602 interferes with the legacy signal as well as the upper layer signal 1600. Again, substantially all guard band is used within the frequency band 1604.

FIG. 17C illustrates a third phase where layered modulation of the whole spectrum is implemented with new signals. The upper layer signal substantially takes the place of the legacy signal while the lower layer signal substantially takes the place of the signal previously layered with the upper layer guard band signal. The CNR for the new upper and lower layer signals are 11.9 dB and 5.4 dB respectively. The excess bandwidth ratio is 0.1 for both signals. At this final phase, spectral efficiency increases to 264%. Here the third signal of the second phase becomes the upper layer signal 1600 over the lower layer signal 1602. Substantially all guard band is used within the frequency band 1604.

This concludes the description including the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching.

It is intended that the scope of the invention be limited not by this detailed description, but rather by the claims appended hereto. The above specification, examples and data provide a complete description of the manufacture and use of the apparatus and method of the invention. Since many embodiments of the invention can be made without departing from the scope of the invention, the invention resides in the claims hereinafter appended.

What is claimed is:

1. A method for transmitting signals and receiving signals in a legacy receiver and a layered modulation receiver, comprising:
    amplifying an upper layer signal portion of a downlink signal at a first power level within a frequency band of the downlink signal;
    amplifying a lower layer signal portion of the downlink signal at a second power level within the frequency band of the downlink signal, the second power level being exceeded by the first power level;
    transmitting a layered modulation signal, the layered modulation signal comprising both the amplified upper layer signal portion and the amplified lower layer signal portion interfering with each other within the frequency band, wherein the amplified upper layer signal portion is transmitted by a first transponder and the amplified lower layer signal portion is transmitted by a second transponder and transmitting at the same polarization;
    demodulating the upper layer signal directly from the layered modulation signal in a legacy receiver and in a layered modulation receiver; and
    demodulating the lower layer signal after subtracting a remodulated upper layer signal from the layered modulation signal in the layered modulation receiver and not in the legacy receiver;
    wherein the lower layer signal portion includes a lower layer symbol rate, the upper layer signal portion includes an upper layer symbol rate, and the lower layer symbol rate is lower than the upper layer symbol rate.

2. The method of claim 1, wherein the upper layer signal and the lower layer signal are non-coherent.

3. The method of claim 1, wherein substantially no guard band is used within the frequency band.

4. The method of claim 1, wherein the upper layer signal portion of the downlink signal has a first excess bandwidth ratio and the lower layer signal portion of the downlink signal has a second excess bandwidth ratio, and wherein at least one of the first excess bandwidth ratio and the second excess bandwidth ratio does not exceed 0.1.

5. The method of claim 1, wherein:
    the upper layer signal portion of the downlink signal has a first excess bandwidth ratio and the lower layer signal portion of the downlink signal has a second excess bandwidth ratio;
    the layered modulation signal is transmitted by at least one antenna;
    the method further comprises the step of amplifying a third signal portion of the downlink signal, the third signal portion having a third excess bandwidth ratio and being transmitted by the at least one antenna to occupy a majority of the frequency band of the downlink signal; and
    the upper layer signal and the lower layer signal together comprise a non-legacy signal, transmitted in a remainder of the frequency band of the downlink signal;
    the third signal portion comprises a legacy signal;
    the third excess bandwidth ratio does not exceed 0.2; and
    the first excess bandwidth ratio and the second bandwidth ratio do not exceed 0.1.

6. The method of claim 1, wherein the upper layer signal comprises a legacy signal in a satellite television system, and the lower layer signal comprises a non-legacy signal in the satellite television system.

7. The method of claim 1, wherein the upper layer signal portion is modulated with a first modulation scheme and the lower layer signal portion is modulated with a second modulation scheme different to the first modulation scheme.

8. A satellite television system for transmitting signals and receiving signals, comprising:
    a first amplifier for amplifying an upper layer signal portion of a downlink signal at a first power level within a frequency band of the downlink signal;
    a second amplifier for amplifying a lower layer signal portion of a downlink signal at a second power level within the frequency band of the downlink signal, the second power level being exceeded by the first power level;
    at least one antenna for transmitting a layered modulation signal, the layered modulation signal comprising both the upper layer signal portion and the lower layer signal portion interfering with each other within the frequency band, wherein the amplified upper layer signal portion is transmitted by a first transponder and the amplified lower layer signal is transmitted by a second transponder transmitting at the same polarization as the first transponder; and a legacy receiver configured to demodulate the upper layer signal portion from the layered modulation signal and not configured to demodulate the lower layer signal portion; and a non-legacy receiver configured to demodulate the upper layer signal portion directly from the layered modulation signal and configured to demodulate the lower layer signal by subtracting a remodulated upper layer signal from the layered modulation signal;

wherein the lower layer signal portion includes lower layer symbol rate, the upper layer signal includes an upper layer symbol rate and the lower layer symbol rate is less than the upper layer symbol rate.

9. The system of claim 8, wherein substantially no guard band is used within the frequency band.

10. The system of claim 8, wherein the upper layer signal and the lower layer signal are non-coherent.

11. The system of claim 8, wherein the upper layer signal comprises a legacy signal in the satellite television system and the lower layer signal comprises a non-legacy signal in the satellite television system.

12. The system of claim 8, wherein the upper layer signal portion is modulated with a first modulation scheme and the lower layer signal portion is modulated with a second modulation scheme different to the first modulation scheme.

13. The system of claim 8, wherein the upper layer portion of the downlink signal has a first excess bandwidth ratio and the lower layer signal portion of the downlink signal has a second excess bandwidth ratio, and wherein at least one of the first excess bandwidth ratio and the second excess bandwidth ratio does not exceed 0.1.

14. The system of claim 13, further comprising:
means for amplifying a third signal portion of the downlink signal, the third signal portion having a third excess bandwidth ratio and being transmitted by the at least one antenna to occupy a majority of the frequency band of the downlink signal;
wherein the upper layer signal and the lower layer signal together comprise a non-legacy signal, transmitted in a remainder of the frequency band of the downlink signal, and the third signal portion comprises a legacy signal.

15. The system of claim 14, wherein the and the third excess bandwidth ratio does not exceed 0.2 and the first excess bandwidth ratio and the second bandwidth ratio do not exceed 0.1.

16. The system of claim 8, wherein the second transponder is adjacent the first transponder.

* * * * *